(12) United States Patent
Prakash et al.

(10) Patent No.: US 7,133,566 B2
(45) Date of Patent: Nov. 7, 2006

(54) METHOD OF FILLING EXPOSED AREAS IN DIGITAL IMAGES

(75) Inventors: Adityo Prakash, Redwood Shores, CA (US); David Kita, Foster City, CA (US); Edward Ratner, Sunnyvale, CA (US); Oliver Shih, San Jose, CA (US); Hitoshi Watanabe, San Jose, CA (US)

(73) Assignee: Altera Corporation, San Jose, CA (US)

( * ) Notice: Subject to any disclaimer, the term of this patent is extended or adjusted under 35 U.S.C. 154(b) by 219 days.

(21) Appl. No.: 10/029,135

(22) Filed: Dec. 20, 2001

(65) Prior Publication Data

US 2002/0131495 A1    Sep. 19, 2002

Related U.S. Application Data

(60) Provisional application No. 60/257,844, filed on Dec. 20, 2000.

(51) Int. Cl.
    *G06K 9/36* (2006.01)

(52) U.S. Cl. .................................................. 382/243

(58) Field of Classification Search ............... 382/162, 382/166, 173, 180, 181, 197, 203, 232, 233, 382/236, 238–243; 358/453, 464; 345/418, 345/419, 421, 589
    See application file for complete search history.

(56) References Cited

U.S. PATENT DOCUMENTS

| | | | | |
|---|---|---|---|---|
| 4,189,711 A | * | 2/1980 | Frank | 382/180 |
| 4,628,532 A | * | 12/1986 | Stone et al. | 382/197 |
| 4,771,469 A | * | 9/1988 | Wittenburg | 382/203 |
| 4,876,728 A | * | 10/1989 | Roth | 382/153 |
| 5,493,640 A | * | 2/1996 | Itoh et al. | 345/441 |
| 5,748,789 A | * | 5/1998 | Lee et al. | 382/243 |

FOREIGN PATENT DOCUMENTS

| | | |
|---|---|---|
| WO | WO 99/51029 A2 | 10/1999 |
| WO | WO 00/64148 A1 | 10/2000 |
| WO | WO 00/64167 A1 | 10/2000 |
| WO | WO 00/77735 A1 | 12/2000 |

OTHER PUBLICATIONS

Kaup A. et al., "Efficient Prediction Of Uncovered Background In Interframe Coding Using Spatial Extrapolation", 1994 IEEE International Conference, pp. V501-V504, Aachen University of Technology, Germany.

Kaup, A. et al., "A New Approach Towards Description Of Arbitrarily Shaped Image Segments", 1992 IEEE International Workshop, pp. 543-553, Aachen University of Technology, Germany.

(Continued)

*Primary Examiner*—Jose L. Couso
(74) *Attorney, Agent, or Firm*—Okamoto & Benedicto LLP

(57) ABSTRACT

A method of reconstructing a previously occluded area of a video image frame exposed by the motion of a segment within said image frame. In one embodiment the method involves approximating the color values of the pixels in the newly exposed area from the color values of the neighboring image segments. The process is refined by identifying a set of neighboring segments to the exposed area, called fill segments, that most closely resemble the color values of the pixels within the exposed area. These fill segments are then used to reconstruct the color values of the exposed area. In one embodiment, the identities of the fill segments are transmitted to an exemplary decoder.

28 Claims, 48 Drawing Sheets

OTHER PUBLICATIONS

Delopoulos, A. et al., "Object Oriented Motion And Deformation Estimation Using Composite Segmentation", 1995 IEEE, pp. 217-220, Imperial College of Science, Technology & Medicine, London, U.K.

Yokoyama, Y. et al., "Very Low Bit Rate Video Coding Using Arbitrarily Shaped Region-Based Motion Compensation", Dec. 1995 IEEE Transactions on Circuits and Systems for Video Technology, pp. 500-507, vol. 5, No. 6, New York, NY.

* cited by examiner

METHOD OF FILLING EXPOSED AREAS IN DIGITAL IMAGES

CROSS-REFERENCES TO RELATED APPLICATIONS

This application claims priority from U.S. Provisional Application No. 60/257,844, entitled "Filling by coding", filed on Dec. 20, 2000, the disclosure of which is hereby incorporated by reference.

This invention is related to co-pending U.S. patent application Ser. No. 09/591,438, entitled "Method and Apparatus for Digital Image Segmentation," filed Jun. 9, 2000 (hereinafter 'Prakash I'), the disclosure of which is hereby incorporated by reference.

BACKGROUND OF THE INVENTION

The world's technologies for communication, information and entertainment is steadily becoming digital. As part of this trend, still pictures are being stored and transmitted digitally; video is being transmitted and stored in digital form. Digital images and video together constitute an extremely important aspect of modern communication and information infrastructure. Efficient methods for processing multi-dimensional signals such as digital video and images are of deep technological significance. Examples of common application areas where such sophisticated processing is absolutely necessary include image and video compression for efficient video storage and delivery, manipulation of digital images and video frames for effective generation of artificial scenes, image or video restoration etc.

In the context of video compression since a number of the same objects move around in a scene spanning several video frames, one attempts to create shortcuts for describing a current video frame being encoded or compressed in relation to other video frames that have already been transmitted or stored in the bit stream through a process of identification of portions of the current frame w/other portions of previously sent frames. This process is known as motion compensation. As illustrated in FIG. 1A, in technologies such a MPEG 1, 2 and 4, the image frame is subdivided into square blocks that are then matched to a previously encoded frame and a displacement vector, also called motion vector, is placed in the bit stream indicating that the block in question should be replaced by the corresponding block in a previously encoded frame.

Such block-based motion compensation suffers from the limitation that the objects within most images are not built up of blocks. Such an attempt leads to poor matching and motion compensation. In particular blocks that traverse the boundary of two objects tend to have even poorer matches than others. This situation is illustrated in FIG. 1B where block 102 is matched with block 102' of a previous frame, but block 104 at the boundary of two objects cannot be matched with block 104'. Hence it becomes desirable to be able to directly manipulate the inherent constituent components in any given video frame, which are the objects or parts of objects, segments of arbitrary shapes (as allowed for instance in MPEG4 or as disclosed in Prakash I) as the fundamental entities for use in motion compensation. Any form of motion compensation based on blocks or objects suffers from an additional drawback that as objects move in a video scene, previously occluded regions that constitute new information, appear in the image frame. Such new information in regions that were previously occluded and are now visible, hereafter referred to as exposed area or exposed region, constitute a very large proportion of the encoded information or bit stream in existing video compression technologies. Furthermore, applications such as artificial scene generation based on manipulation of objects or segments that are moved and placed in new locations, also result in such exposed areas. In applications such as image or video restoration where certain parts of an image may be unavailable, lost or corrupted, such regions may also be considered as unknown regions or exposed areas.

SUMMARY OF THE INVENTION

A method of filling exposed areas of a video image is disclosed herein. In its current embodiment, the method involves approximating the color values of the pixels in the exposed area from the color values of a subset of the neighboring segments. The multipart method is focused on identifying the neighboring segments, which most closely resemble the local color values of the exposed area. Selection and transmission of the identities of such segments to an exemplary decoder allows the decoder to efficiently reconstruct the exposed area. Following the identification of an exposed area, the segments that are adjacent to the said exposed area are identified and designated as boundary segments. A reference filling routine is performed next, which involves comparing the estimated value of each pixel with the actual value of the pixel and discarding the estimated value if it is not a close approximation. This method produces a good reconstruction of the actual color values of the exposed area pixels. The next step involves determining which boundary segments are to be used for filling the exposed area and designating them as fill segments. A predictive filling routine is then performed utilizing only the segments designated as fill segment. The results are compared with that of the reference filling routine to ensure that the predictive filling generates a close approximation of the reference filling and hence the actual color values of the exposed area pixels. If the difference between the reference fill and the predictive fill results are greater than a certain threshold value, the filling routine is recalculated using a smaller set of boundary pixels. A final set of fill segments is then determined. In one embodiment the fill segment information is transmitted to an exemplary decoder.

DESCRIPTION OF THE SPECIFIC EMBODIMENTS

The invention herein pertains to a highly effective method for approximating the information in exposed areas. The application of the invention results in significantly lowering the cost of transmission and storage of multidimensional signals such as digital video and images compared to that incurred by existing technologies. The invention also improves the quality and cost of digital video and image restoration.

Introduction

When an object within a sequence of digital image frames changes position, a newly uncovered area is exposed. In order to efficiently encode this newly uncovered area, it would be desirable to approximate the color of the newly uncovered region by extending the characteristics of it neighbors. This method of approximation would be particularly valuable in situations where large amount of video data needs to be transmitted through narrow transmission channels such as telephone lines. This method can also be useful for storage of digital video data when storage disk space is limited. The preferred embodiment is to use the current invention as a front end to a residue encoder because it forms a better approximation of the image.

Figure 1A:
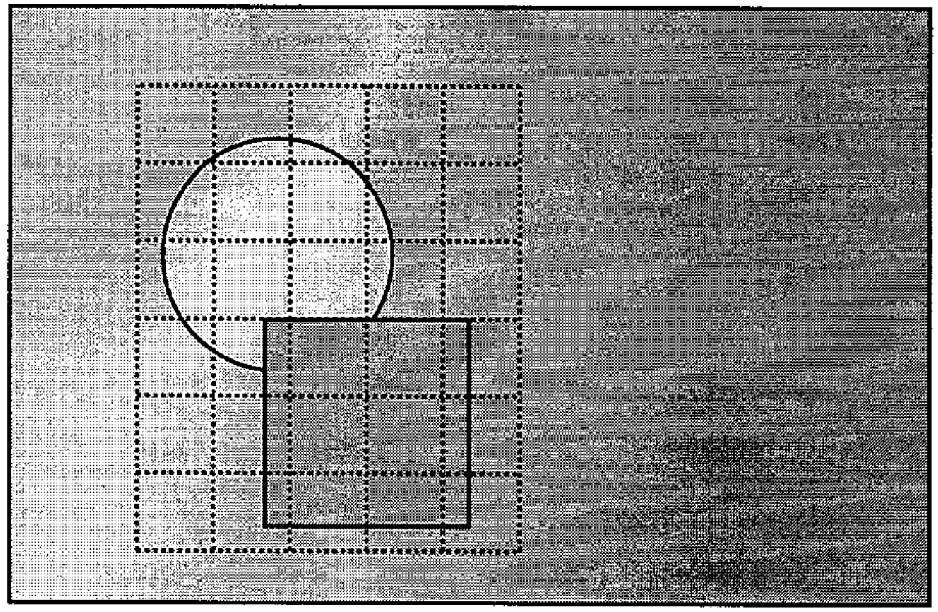
FIG. 1A–B illustrates MPEG compression scheme.
Figure 1B:
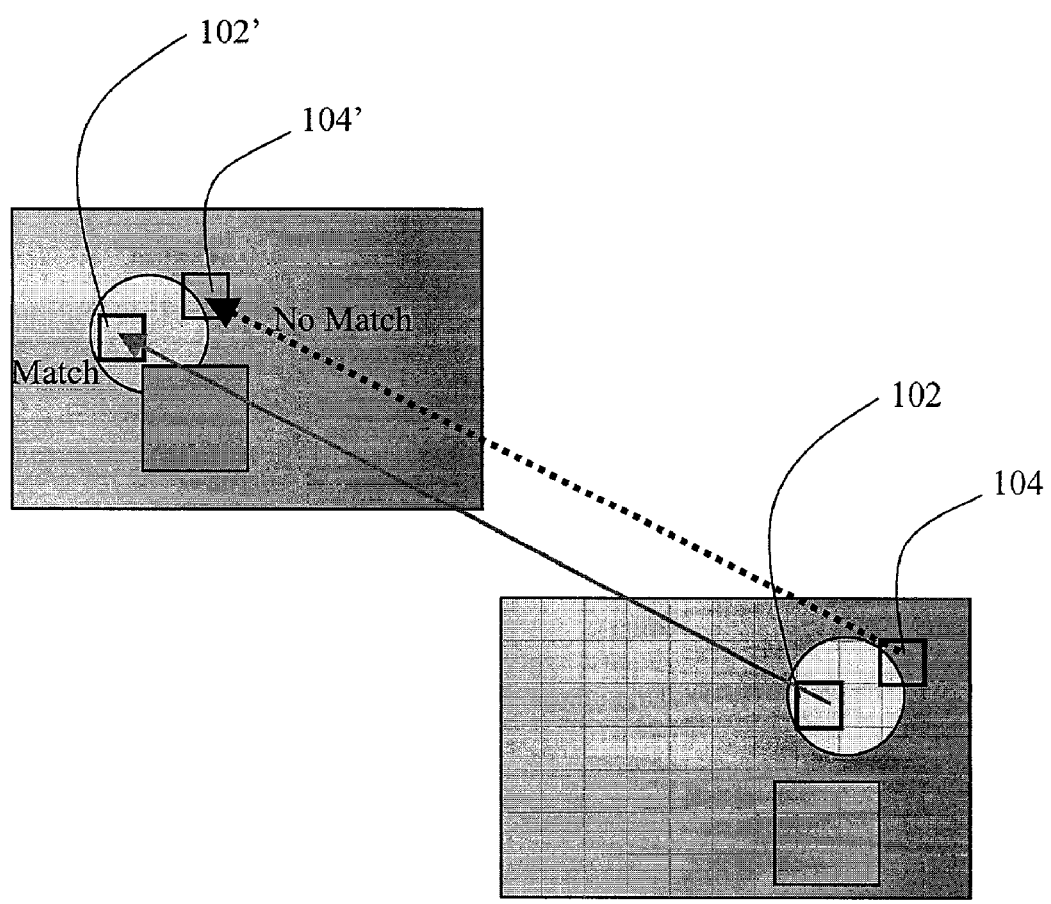
Figure 2A:
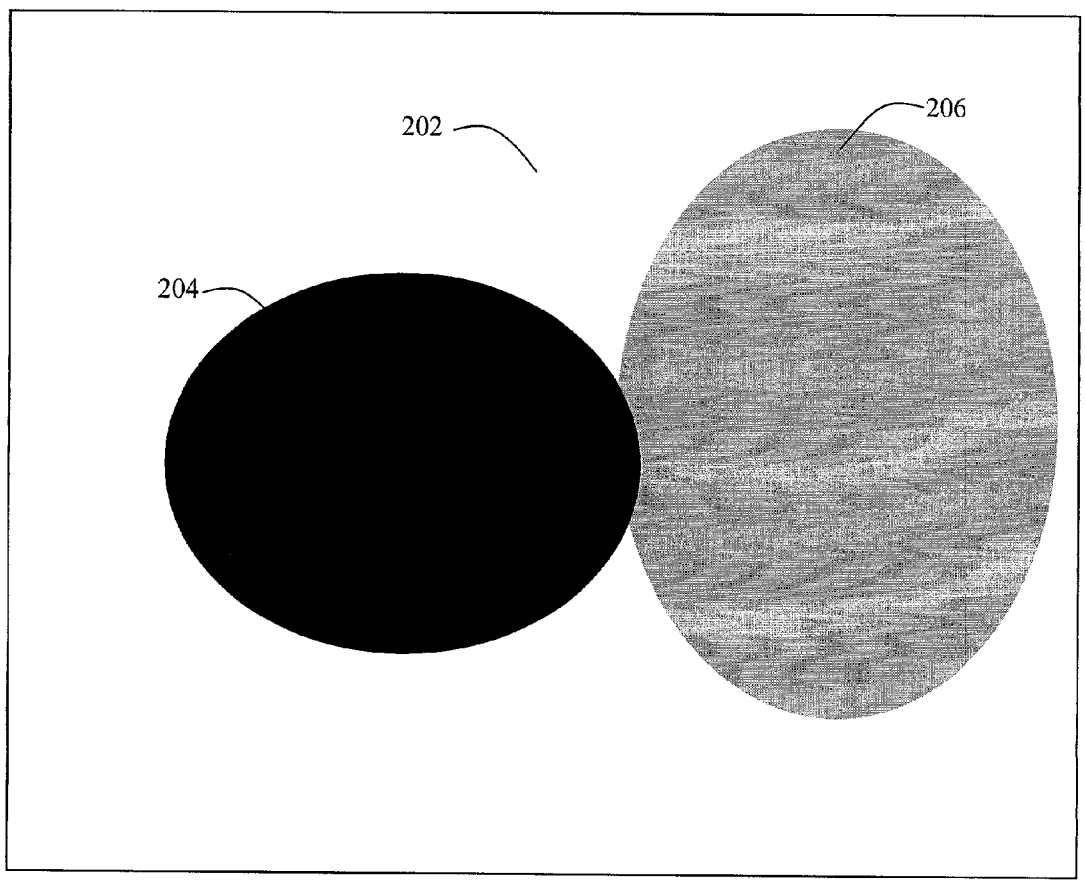
FIG. 2A illustrates four segments of a digital image frame.
Figure 2B:
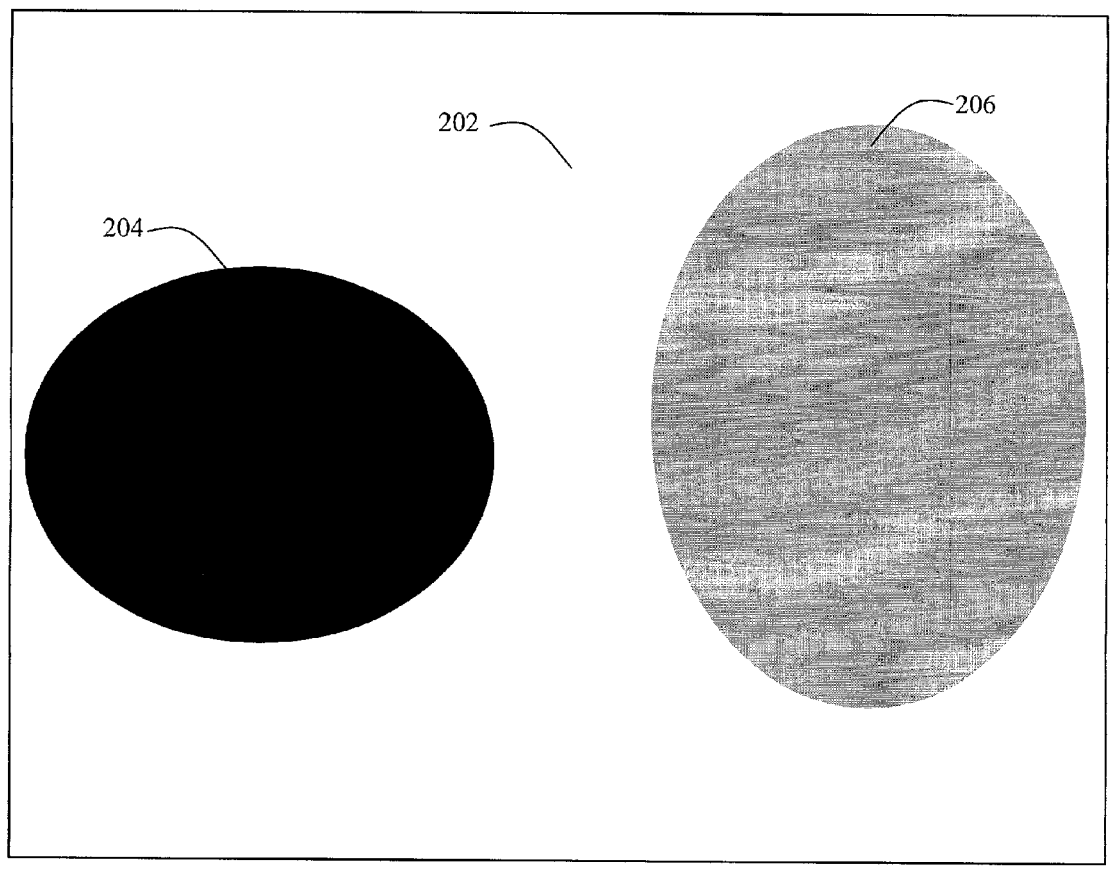
FIG. 2B illustrates a second image frame where the segments have moved relative to one another.
Figure 2C:
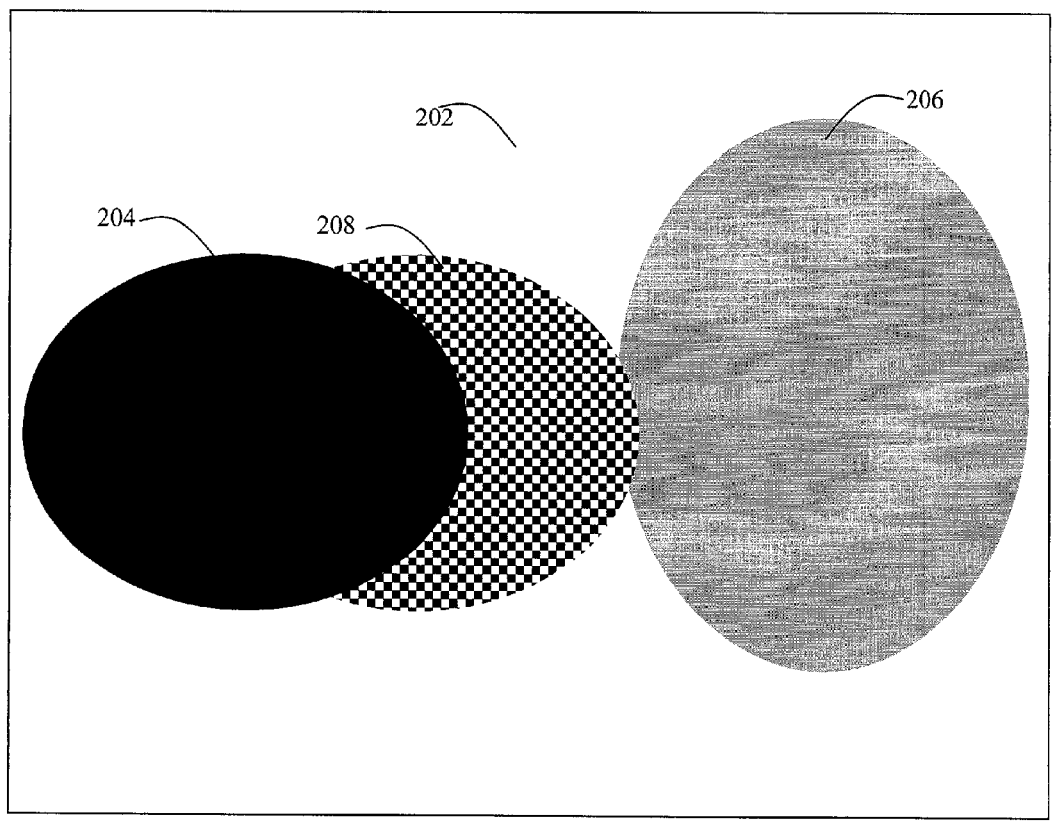
FIG. 2C illustrates a second image frame where the segments have moved relative to one another and an exposed area is visible.
Figure 2D:
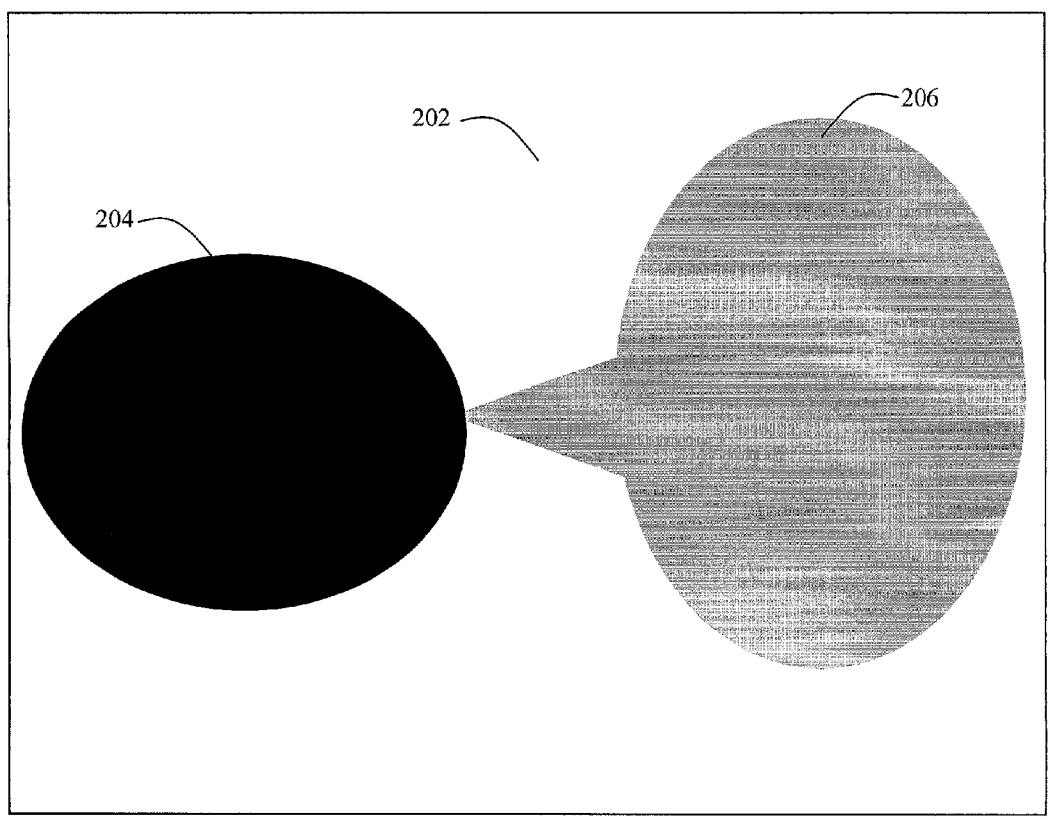
FIG. 2D illustrates the results of filling which generates a poor reconstruction of the exposed area.
Figure 2E:
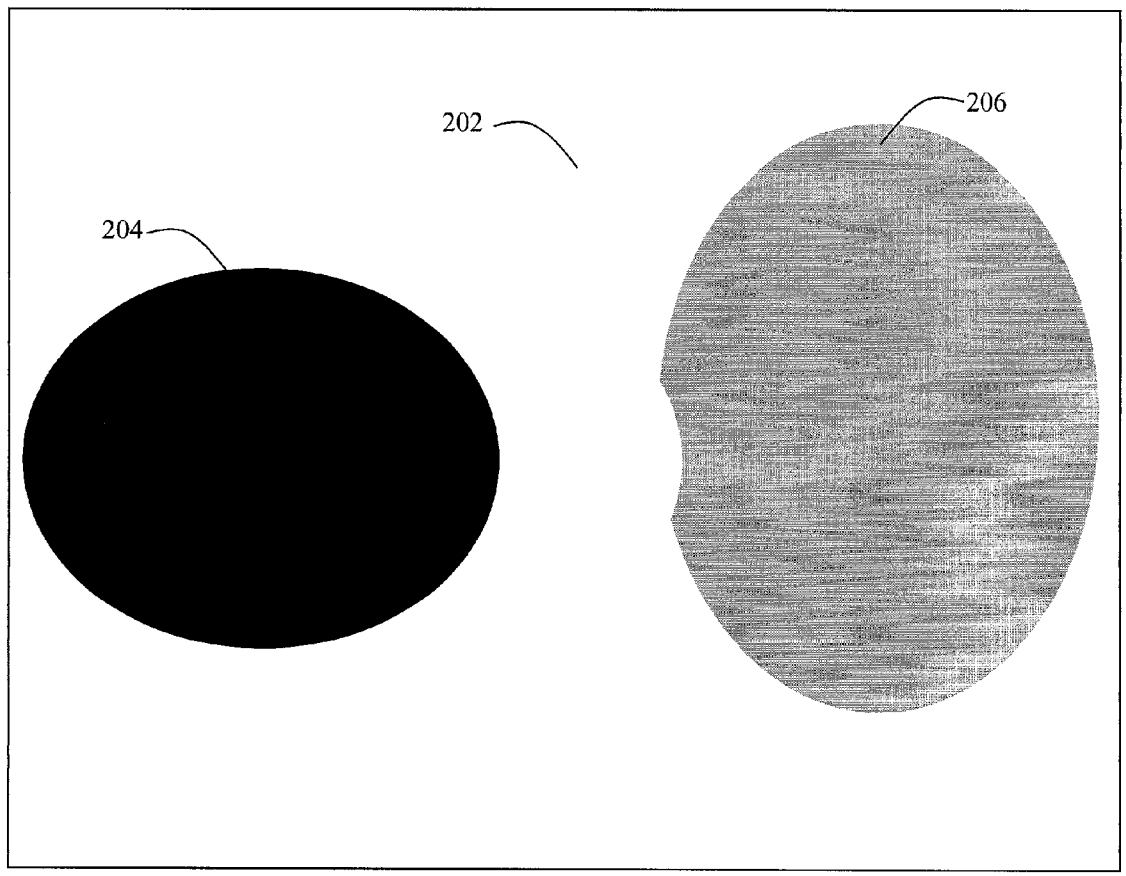
FIG. 2E illustrates the results of filling which generates a good reconstruction of the exposed area.

The invention disclosed herein utilizes an image segmentation scheme disclosed in the Segmentation patent application. This image segmentation method subdivides a digital image into segments based upon the natural boundaries of the objects within the image frame. FIG. 2A illustrates such an image frame where the image is subdivided into 3 segments 202, 204 and 206. As illustrated in FIG. 2B, when the objects move relative to one another, a previously occluded area is exposed. In FIG. 2C, this area is designated 208. Since the image frame is segmented along the natural boundaries of the objects therein the color of the exposed area 208 is likely to be similar to the color of one or more of the surrounding segments. Therefore using the surrounding segments, an 'intelligent' encoding method can determine the likely color or colors of region 208 by receiving only a small fraction of the information required by existing video compression schemes. FIG. 2D illustrates a poor approximation of the exposed area that can be produced if it is filled using information from surrounding segments without determining which of these segments most closely resemble the color values of the exposed area. FIG. 2E illustrates a better approximation of the exposed area when it is filled by using information from a subset of the boundary segments, in this case segment 202. It is envisioned that the present invention will be used for exposed areas that are relatively small compared to the segments surrounding them either in terms of the area or in terms of their aspect ratio or when there is low contrast between the actual color values of the exposed area and at least one of the boundary segments.

Brief Overview

This invention uses a multi-step process to determine the color information of the newly exposed image regions. The steps are as follows:

Obtaining a first image frame and a second image frame.

Determining newly uncovered image segments in the second frame.

Determining which segments are adjacent to the newly uncovered image segment and designating them as boundary segments.

Carrying out a reference filling routine.

Determining which boundary segments are to be used for filling the exposed area and designating them as fill segments.

Carrying out a predictive filling routine and comparing the results with that of the reference filling routine.

Recalculating the filling routine when the difference between the initial fill and the secondary fill results are greater than a certain threshold value.

Determining the final set of fill segments.

Efficient transmission of the fill segment information to an exemplary decoder.

Obtain Segments

For purposes of this disclosure, a segment is a portion of the image where the color is uniform or nearly uniform. It is not germane to this disclosure how the segments were obtained.

Segment Motion

In one embodiment, the motion of the segments from Frame 1 to Frame 2 are encoded as motion vectors for use in reconstructing the second frame. For purposes of this disclosure, it does not matter how the motion vector were determined.

Determine Newly Discovered Areas

In the process of reconstructing a second frame from the previous frame and information about the segment motion, there may be areas in the second frame that are devoid of video information as exemplified by the region 208 in FIG. 2C.

Determine Boundary Segments

For purposes of this disclosure, it does not matter how the surrounding segments are determined. In one embodiment, at each point in the perimeter, nearest neighbor points are examined and any segment containing such point is considered a surrounding segment. In another embodiment a segment is included as a boundary segment only if it has sufficient contact with the exposed area. In a third embodiment, segments overlapping an annular region around the exposed area may be used to determining the boundary segments.

Reference Filling:

Following the identification of the boundary segments, a routine is carried out that fills the exposed area using the color values of all of the boundary segments and subsequently compares the results of this filling routine with the actual color values of the pixels within the exposed area. The actual color values for comparison are obtained from the actual second frame and the filling is carried out on the second frame being reconstructed from the previous frame.

An image frame with an exposed area is an intermediate step in the process of reconstructing an image frame from the previous frame. This situation occurs when an image segment has moved but the information regarding the color of the exposed area is not available. It is important to note that such a situation occurs commonly in video compression where an exemplary encoder has transmitted the information regarding the motion of a segment to a decoder, but not the color values of the exposed area. Unlike a decoder, an exemplary encoder will have available the actual color values of the exposed area. Hence an encoder can fill in the exposed area by using the color information available from the boundary segments and compare the results with the actual value of the pixels within the exposed area. In contrast a decoder will be able to perform this filling based upon geometry. This will be elaborated in a later section.

Figure 3:
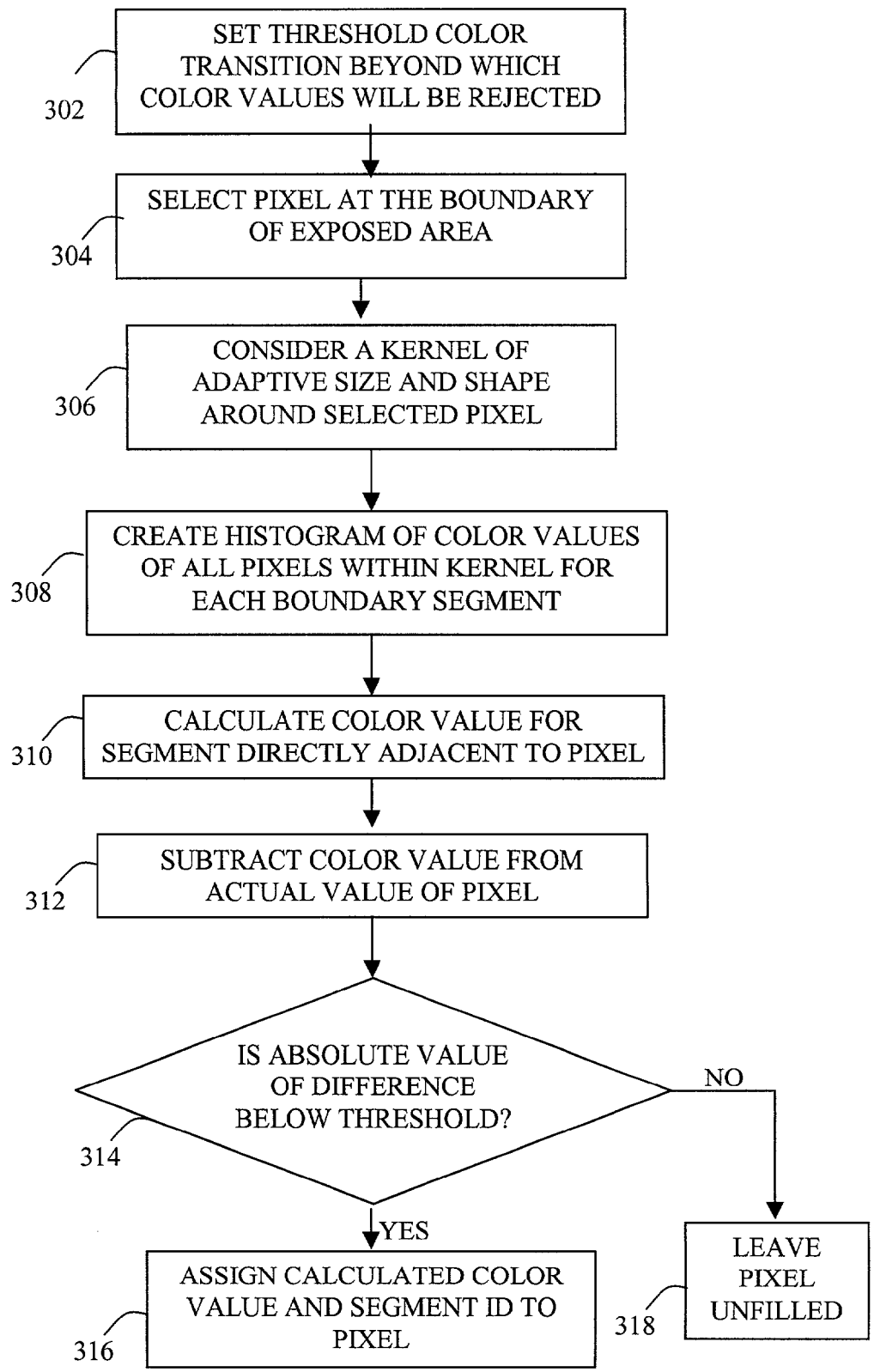
FIG. 3 illustrates the steps of a reference filling routine.
Figure 4A:
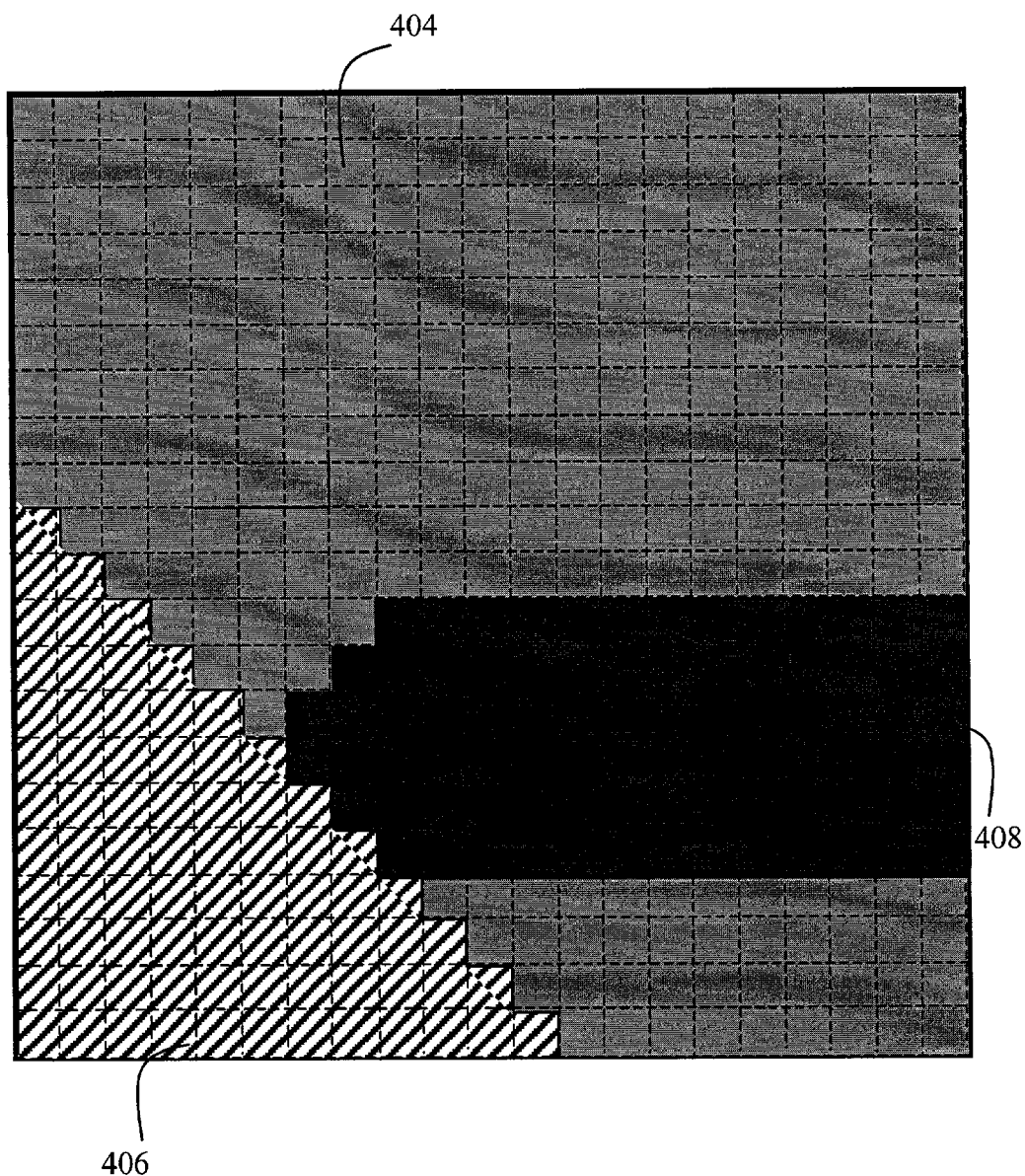
FIG. 4 A–L illustrate reference filling.
Figure 4B:
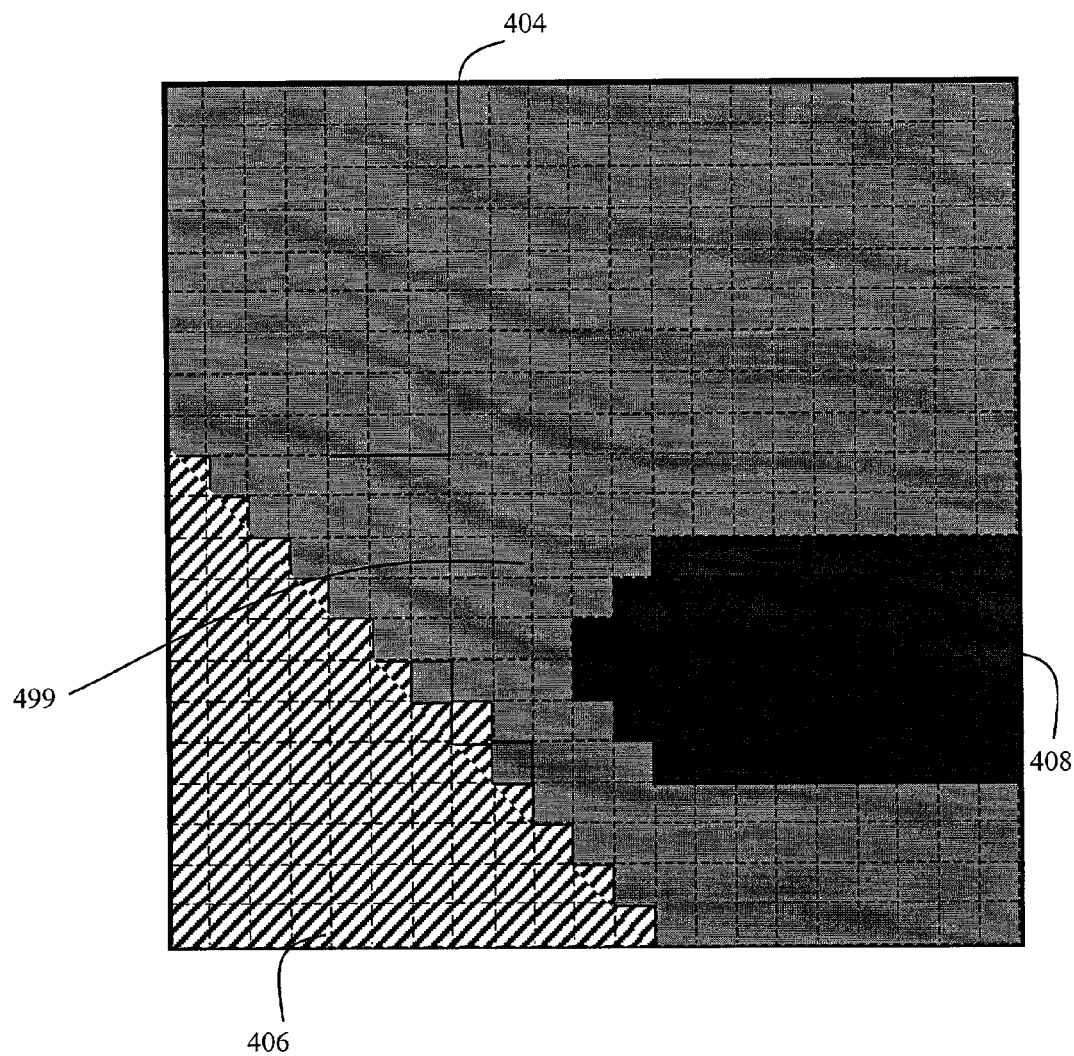
Figure 4C:
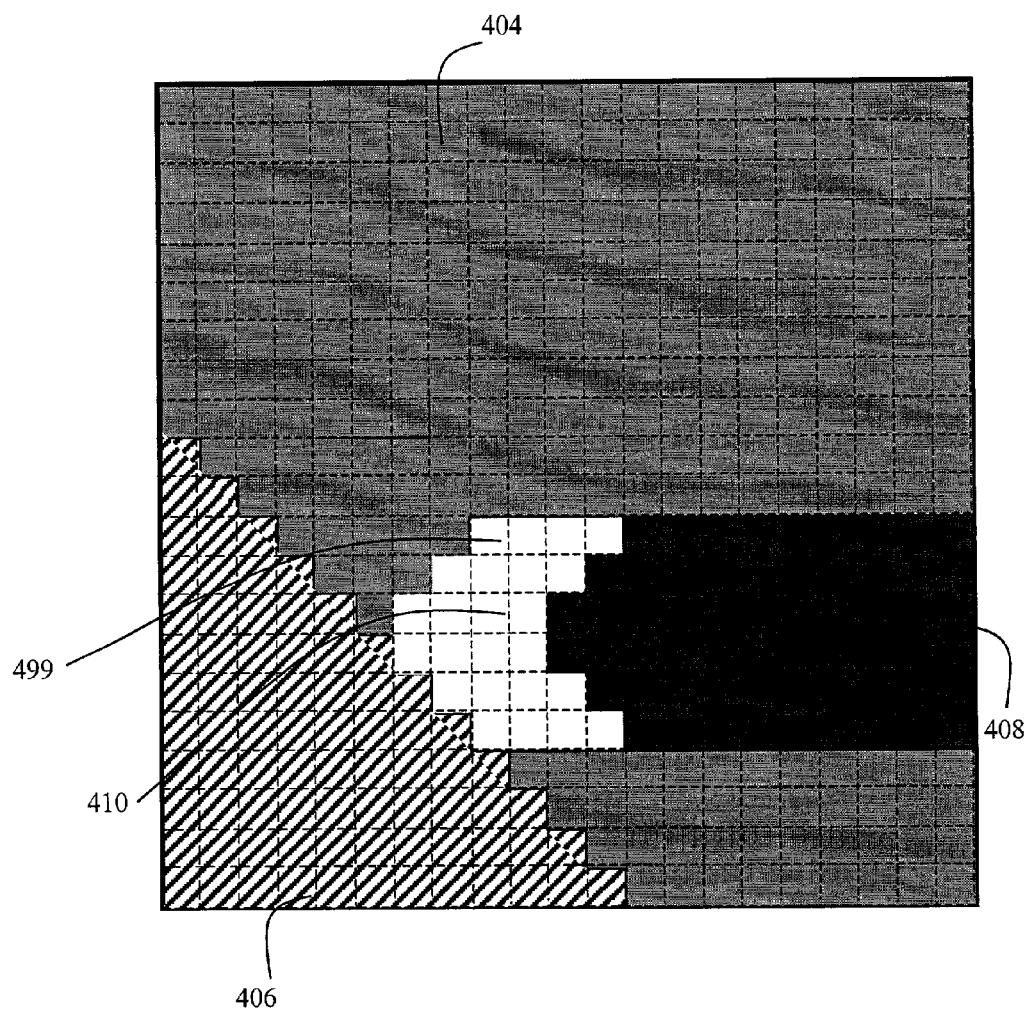
Figure 4D:
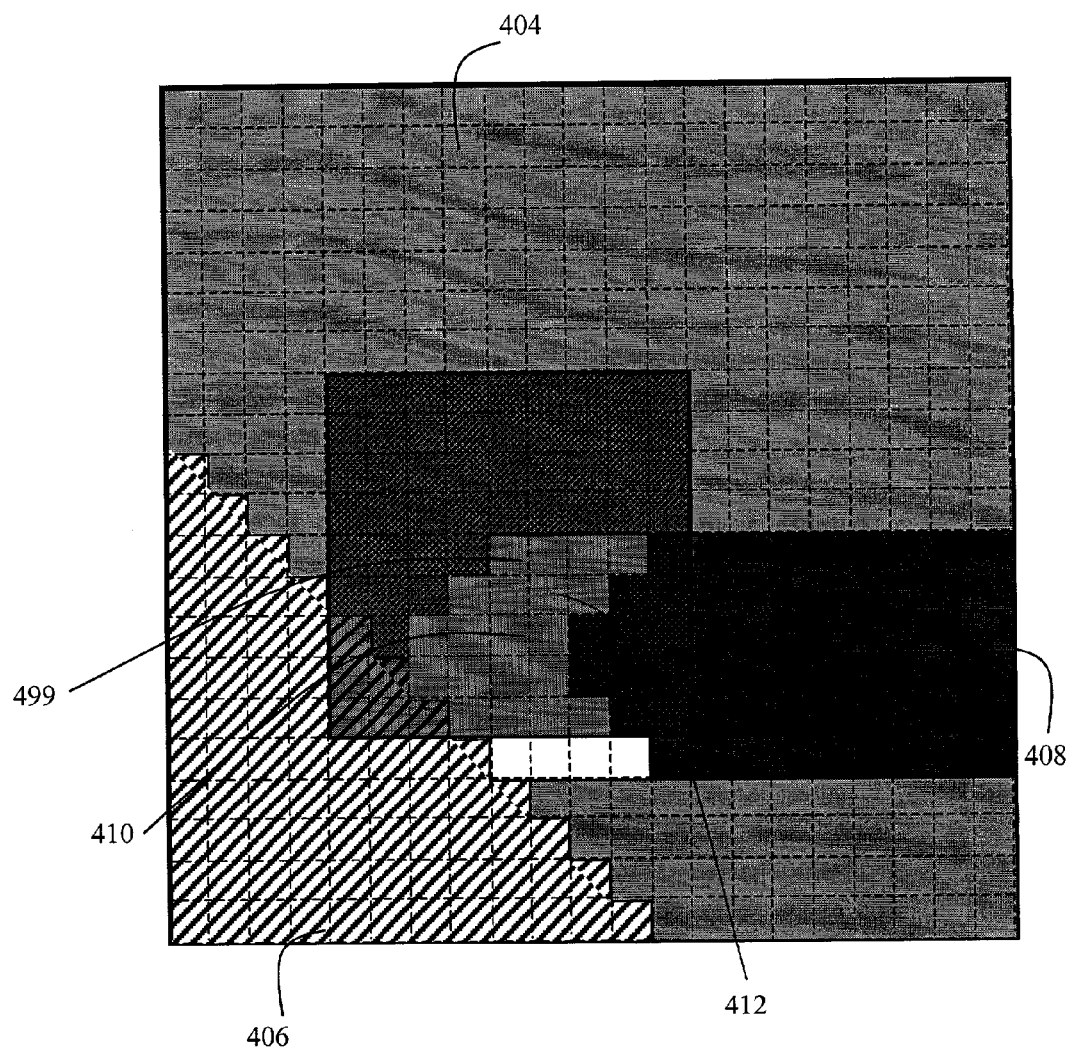
Figure 4E:
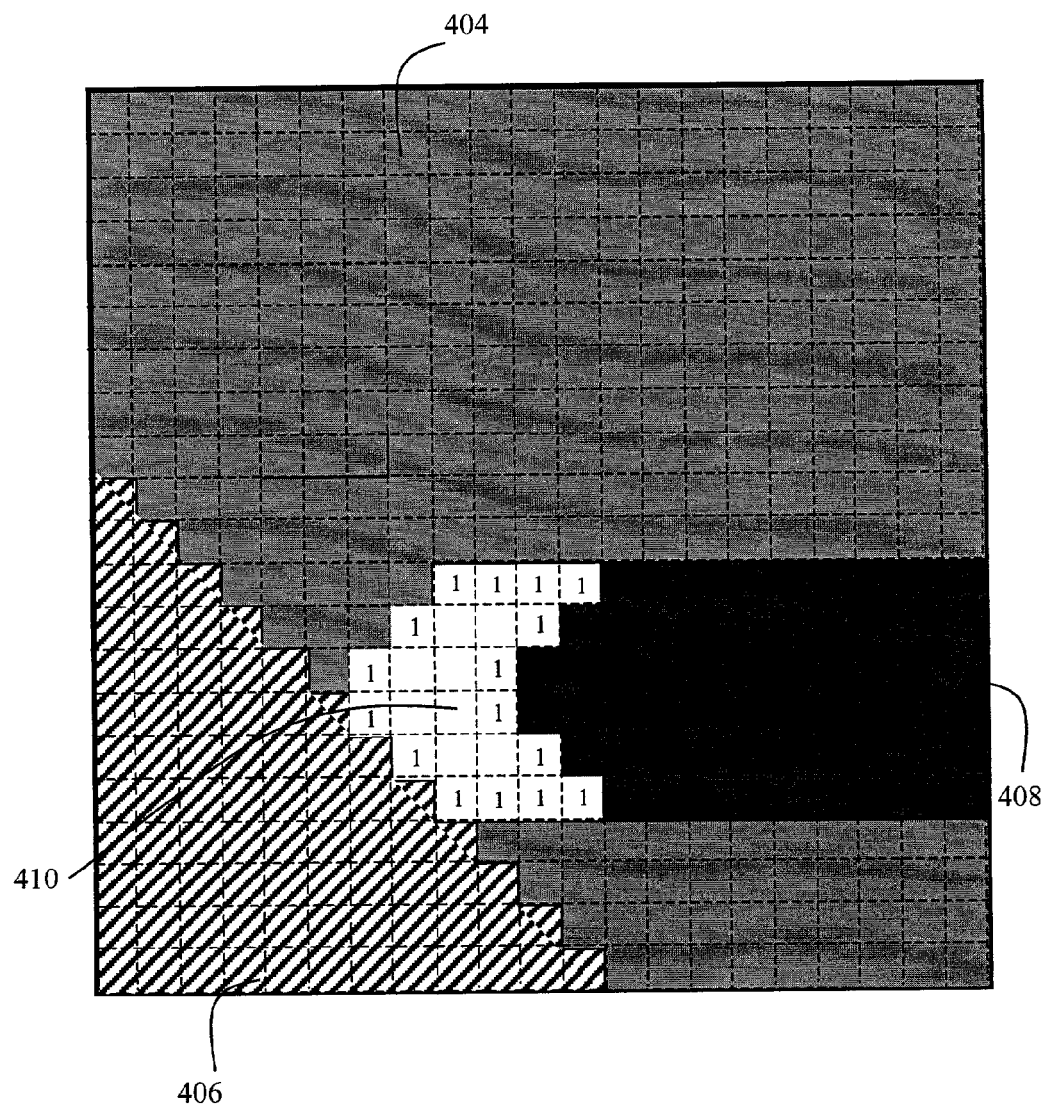
Figure 4F:
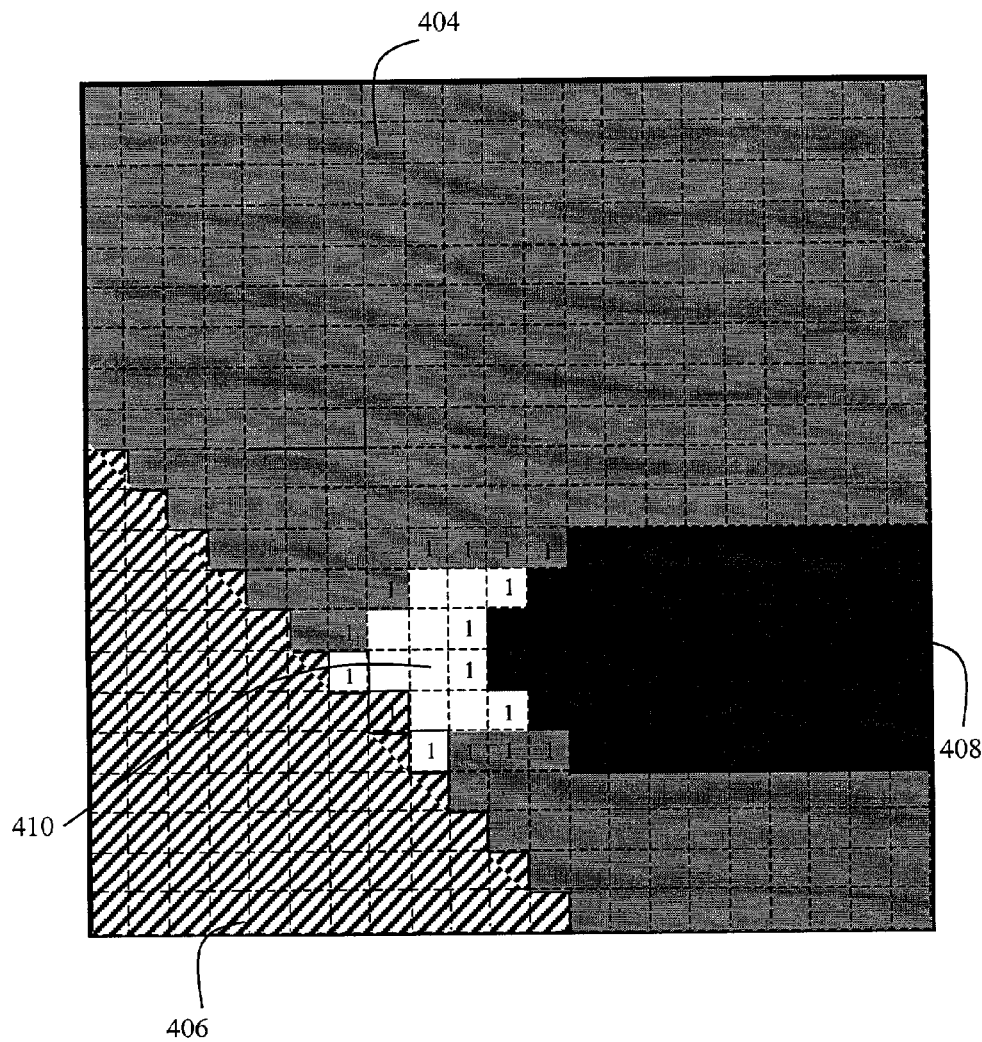
Figure 4G:
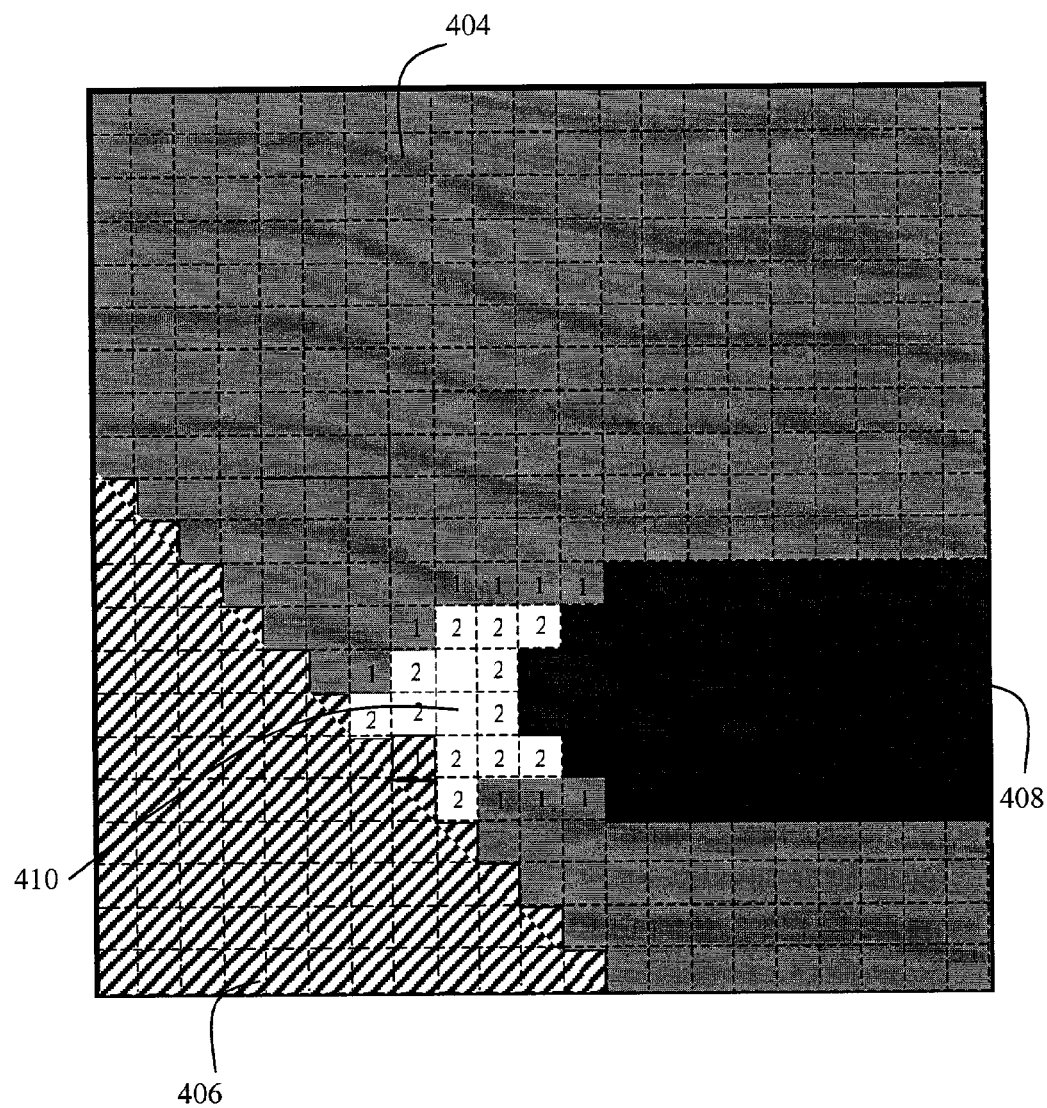
Figure 4H:
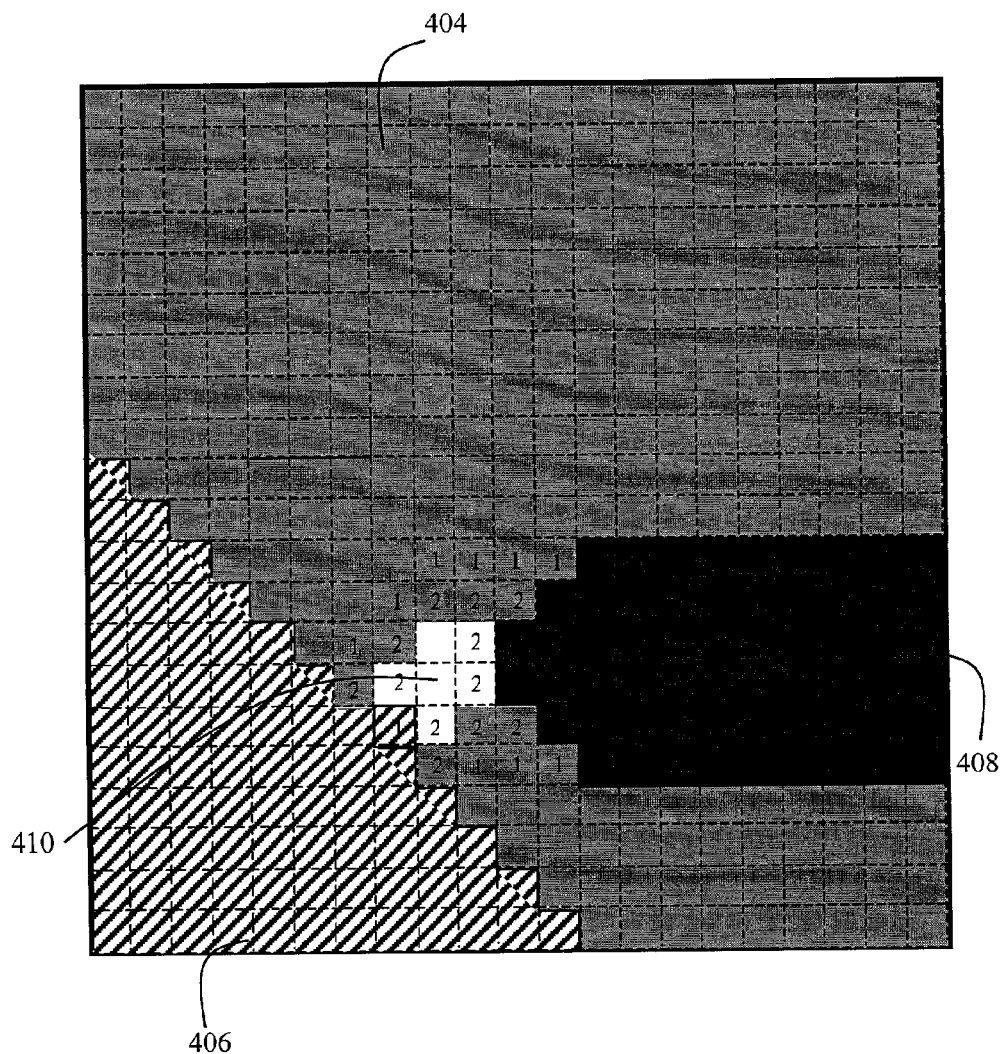
Figure 4I:
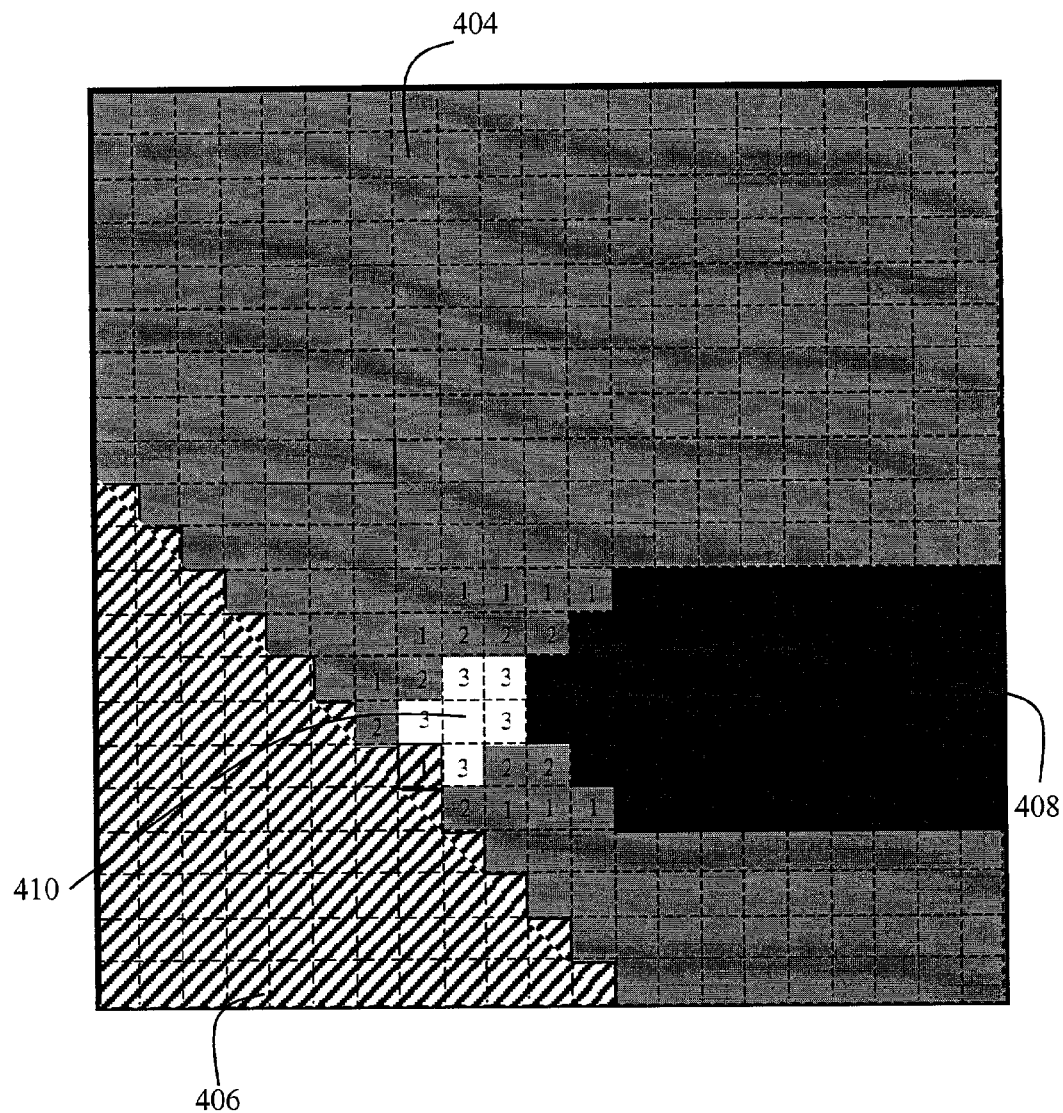
Figure 4J:
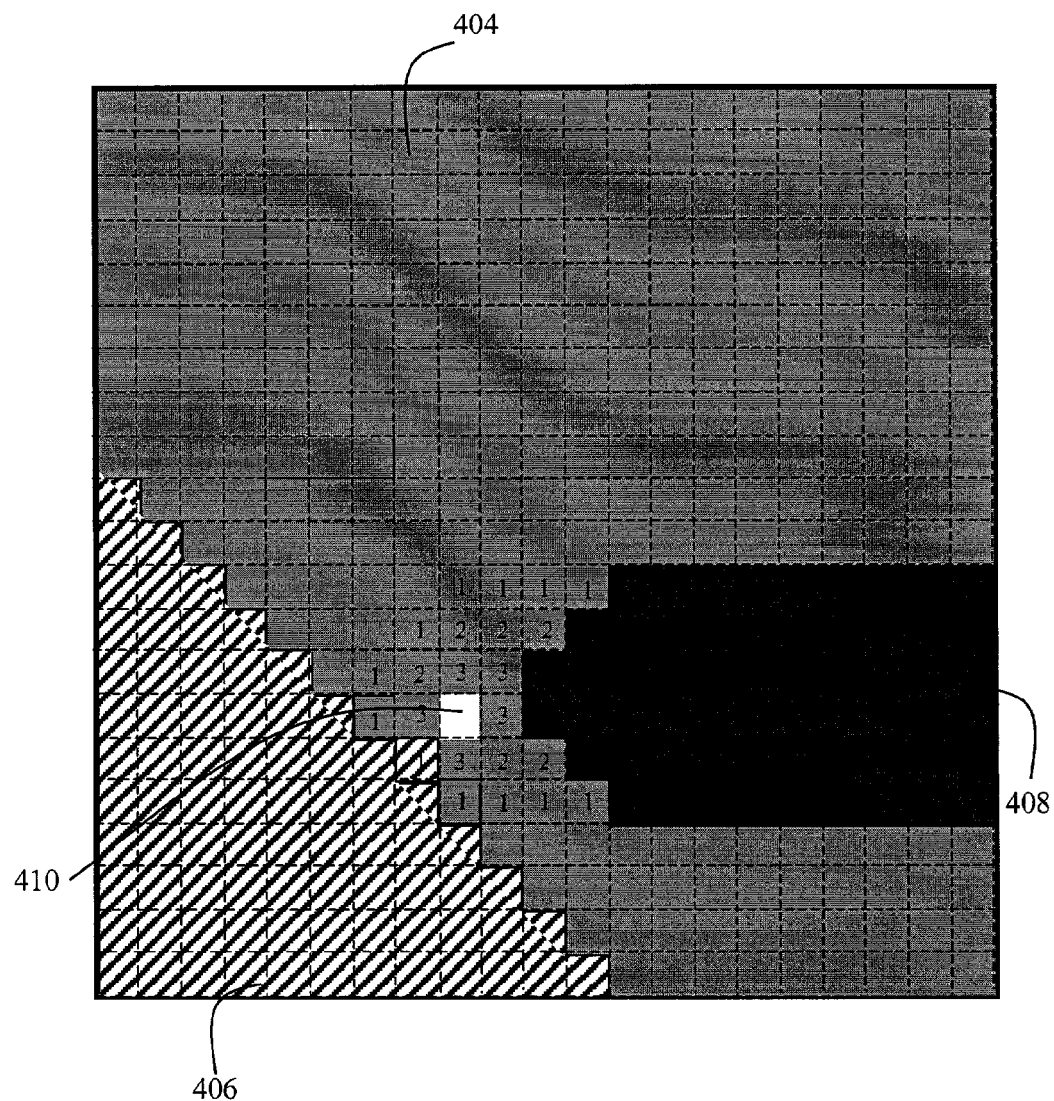
Figure 4K:
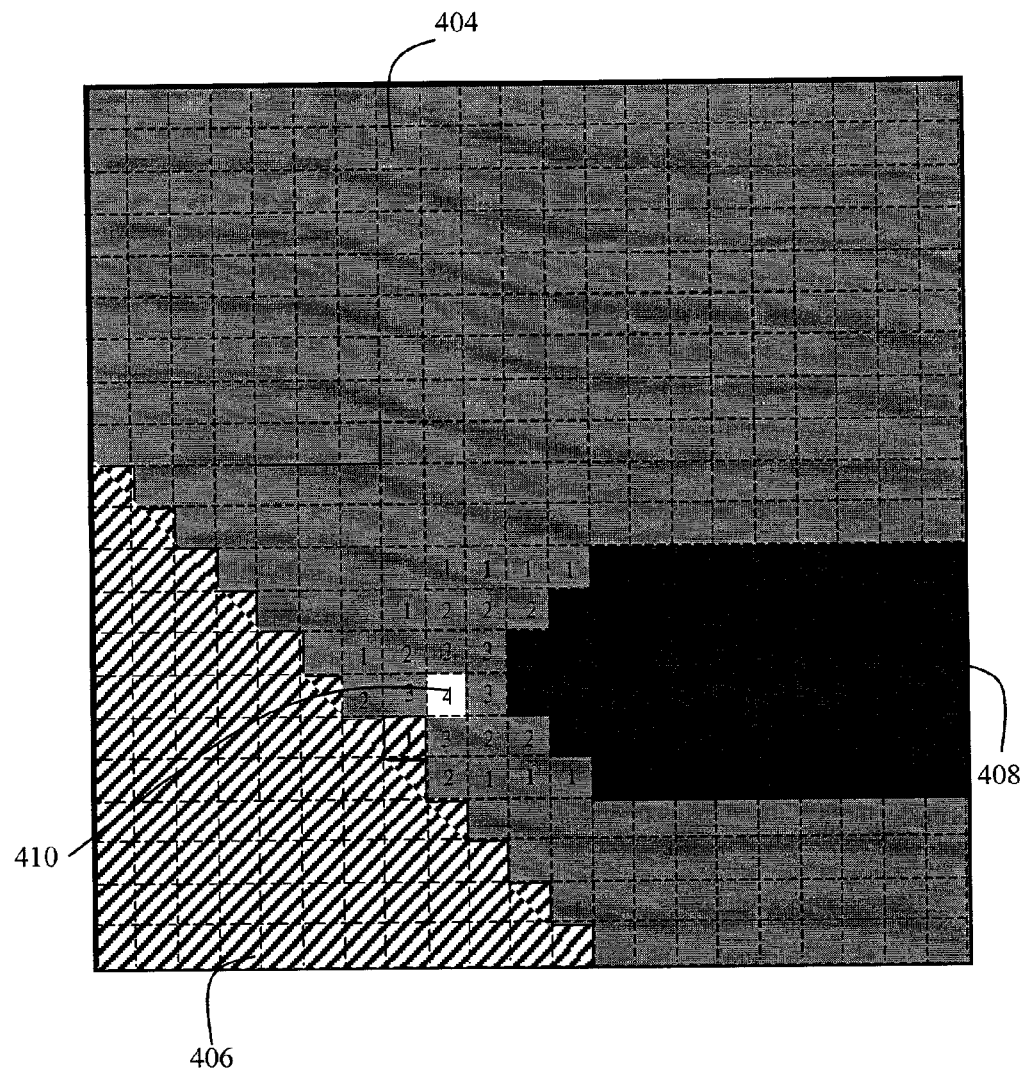
Figure 4L:
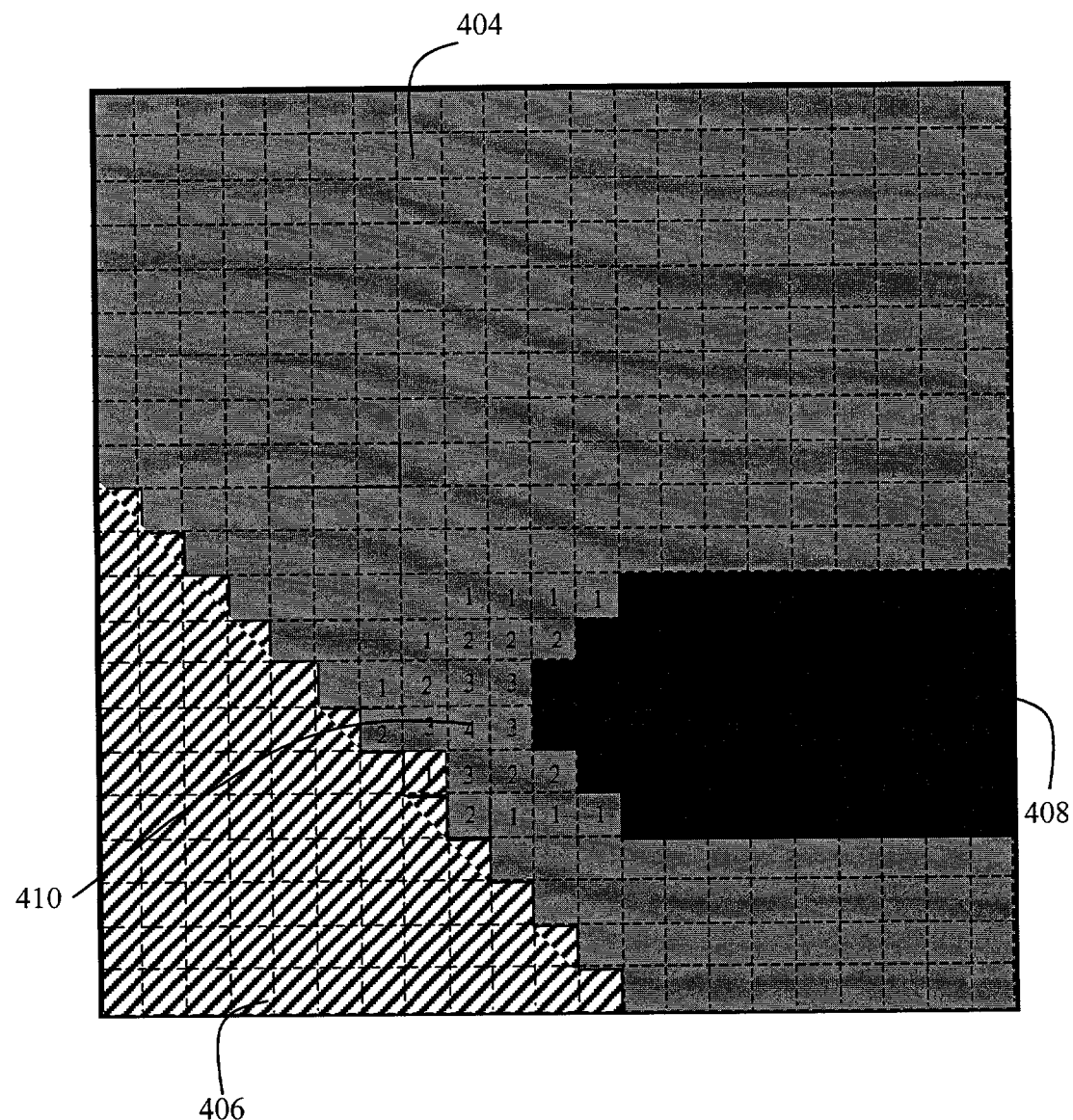

FIG. 3 illustrates the method of reference filling. The routine begins with setting a threshold value for color difference, also called color transition (302). Then the routine considers each pixel that is most proximal to the edge of the exposed area and considers an adaptively sized kernel around it (304, 306). The size and shape of the kernel is determined adaptively and may be based upon geometry of the exposed area or color values of the boundary segment or both. FIG. 4C illustrates such an exposed area where pixel 499 of the exposed area 410 is being filled and 404, 406 and 408 are the boundary segments surrounding exposed area 410. FIG. 4D illustrates a kernel 412 (area shaded in gray) around pixel 499. It is important to note that although the kernel 412 is shown as a square, in practice the kernel may be of any shape. The routine then determines a histogram of colors of all pixels within the kernel for each boundary segment (308). Referring again to FIG. 4D, the kernel overlaps with two boundary segments, 404 and 406 hence there will be two sets of histograms of color distributions for pixel 499. For each segment there will be a histograms of color distribution for each of the color components Y, U and V. In other embodiments, there can be a different set of histograms for other spectral components of the video image frame. The routine then determines which boundary segment is adjacent to the selected pixel and calculates a statistical parameter of the color values for each adjacent segment (310). In FIG. 4C the boundary segment 404 is adjacent to pixel 499 hence the routine calculates a statistical parameter for all of the pixels of segment 404 that falls within the kernel 412. In one embodiment the statistical parameter calculated is the median, however in other embodiments, measures such as but not restricted to mean, mode, the weighted mean or any other statistical moment of the distribution may also be used. The routine then calculates the difference between the actual color value of that pixel and the value of the calculated statistical parameter (312). If the selected pixel is adjacent to more than one boundary segments, the segment closest the actual color value of the selected pixel will be chosen. If this difference is less than the threshold, the pixel is then assigned the color value of the calculated statistical parameter and also assigned the segment identifier of the adjacent segment (314, 316). If the difference is greater than the threshold, the pixel is left unfilled (318). This routine is repeated for every exposed area pixel at the boundary of the exposed area. Once all of pixels in a ring have either been assigned a color and segment identity or left unfilled, the next set of pixels at the boundary of the exposed area are filled using the method described above.

FIG. 4 illustrates the process of reference filling. FIG. 4A is the first frame of an image containing 3 segments 404, 406 and 408. FIG. 4B illustrates a second image frame where the segment 408 has moved and exposed a previously occluded region, where most pixels share color values of segment 404, and one pixel shares the color value of pixel 406. FIG. 4C illustrates the image frame of FIG. 4B, without any color values filling the exposed area 410. As described earlier, FIG. 4D illustrates the domain of an exemplary kernel 412 centered around the pixel 499 at the edge of the exposed area. FIG. 4E illustrates the first ring of pixels at the edge of exposed area 410 labeled 1. These are the first ring of pixels to be filled using the method described in the previous paragraph and delineated in FIG. 3. FIG. 4F illustrates the results of filling the first ring. The pixels that are colored gray or filled with a striped pattern and labeled 1 are filled. The pixels that are labeled 1 and colored white are left unfilled because they were adjacent to a segment that was of significantly different color than their actual values. Here significantly means that their estimated color transitions were greater than a certain threshold. Hence when their colors were estimated the color transition was higher than the accepted threshold. Hence these pixels were left unfilled. FIG. 4G illustrates the second ring of pixels at the boundary of the exposed area. It is worth noting that the unfilled pixels from ring 1 illustrated in FIG. 4F, labeled 1 and colored white, are now part of the second ring. The pixels belonging to the second ring are labeled 2. FIG. 4H shows the results of filling of the second ring. As before, some pixels belonging to ring two were left unfilled because the color transition was greater than the accepted threshold value. FIG. 4I shows the pixels of the third ring labeled 3. FIG. 4J shows the results of filling the third ring. FIG. 4K illustrates the fourth ring. FIG. 4L illustrates the final result of reference filling. It is worth noting that reference filling was able to reconstruct the actual color values of the pixels in the exposed area 410 with high degree of accuracy, since this method compared the calculated value with the actual value of each pixel and accepted only those within a threshold.

Figure 5:
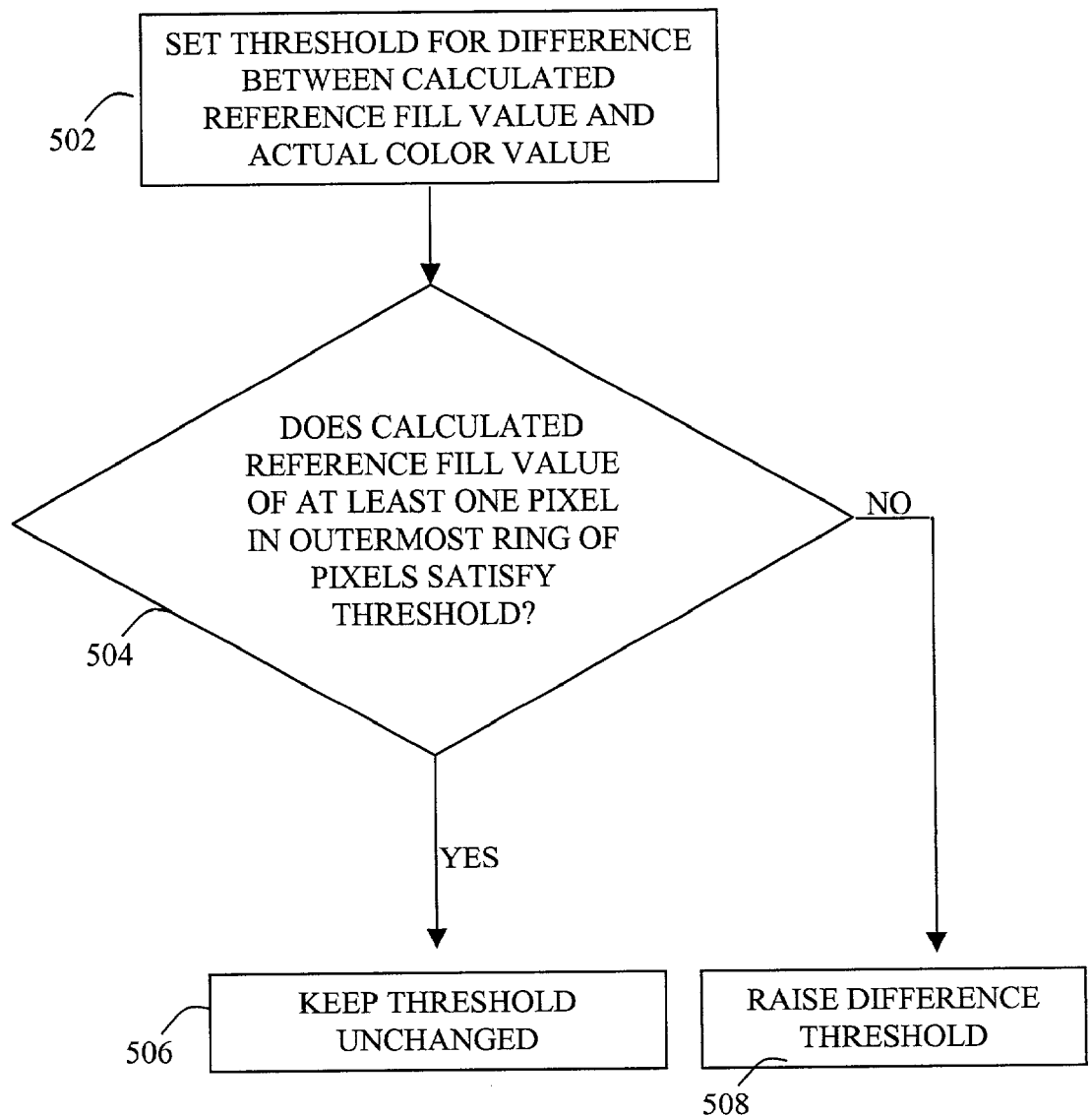
FIG. 5 illustrate the method of changing the threshold value for the difference between the reference fill value and the actual value of an exposed area pixel.

FIG. 5 illustrates the method of changing the threshold value for the difference between the actual and the calculated value of the pixel. During the process of filling the pixels, an entire ring of pixel color values may be calculated and none are filled because the difference between the actual value of each of the pixels and their calculated color values is greater than the preset threshold. In this event the threshold value is increased. In other embodiments this rule may be relaxed and increasing the threshold can be allowed if a certain proportion of the unfilled boundary pixels are unfilled.

Determining Fill Segments:

FIG. 6A illustrates the method of selecting a tentative set of fill segments. First the percentage of pixels that each of the boundary segments contribute are calculated (602, 604). Next a parameter that represents the geometric shape of the regions filled by each of the boundary segments is calculated (606). In one embodiment the geometric parameter may be the perimeter of the exposed area contributed by each of the boundary segments. In another embodiment, the parameter may be the percentage of the area contributed by each of the boundary segments. In an third embodiment the geometric parameter may be any function of both the area and the perimeter contributed by each of the boundary segments.

After determining the appropriate geometric parameter, the routine uses the following criteria to determine which segments will be tentative fill segments:

Firstly, if for any boundary segment, their contribution to the filled region is greater than the average contribution of all of the boundary segments, then that segment is accepted as a fill segment (608, 610). Secondly, if their contribution is less than the average contribution but greater than the pre-determined threshold value (612), then determine if the aspect ratio is sufficiently close to 1, within a pre-determined threshold (614). If this is the case, accept this segment as a tentative fill segment (618), otherwise reject this segment (620). Thirdly, if their contribution to the filled region is less than a pre-determined threshold value, the segment is rejected as a fill segment (614). In another embodiment a different statistical parameter may be used as the criteria for choosing the tentative fill segments.

Figure 7A:
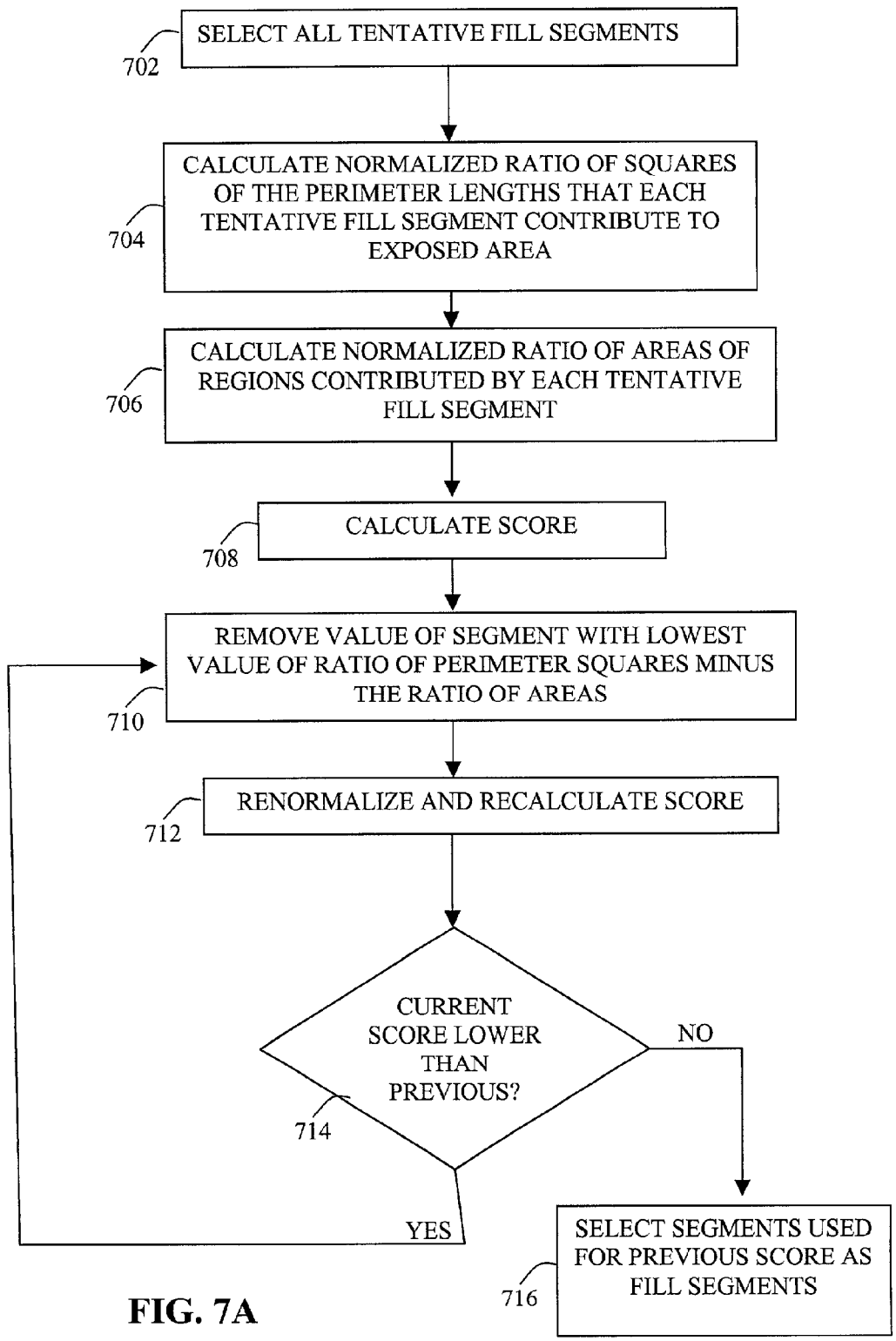
FIG. 7A illustrates the steps of determining a set of fill segments from a tentative set of fill segments.
Figure 7B:
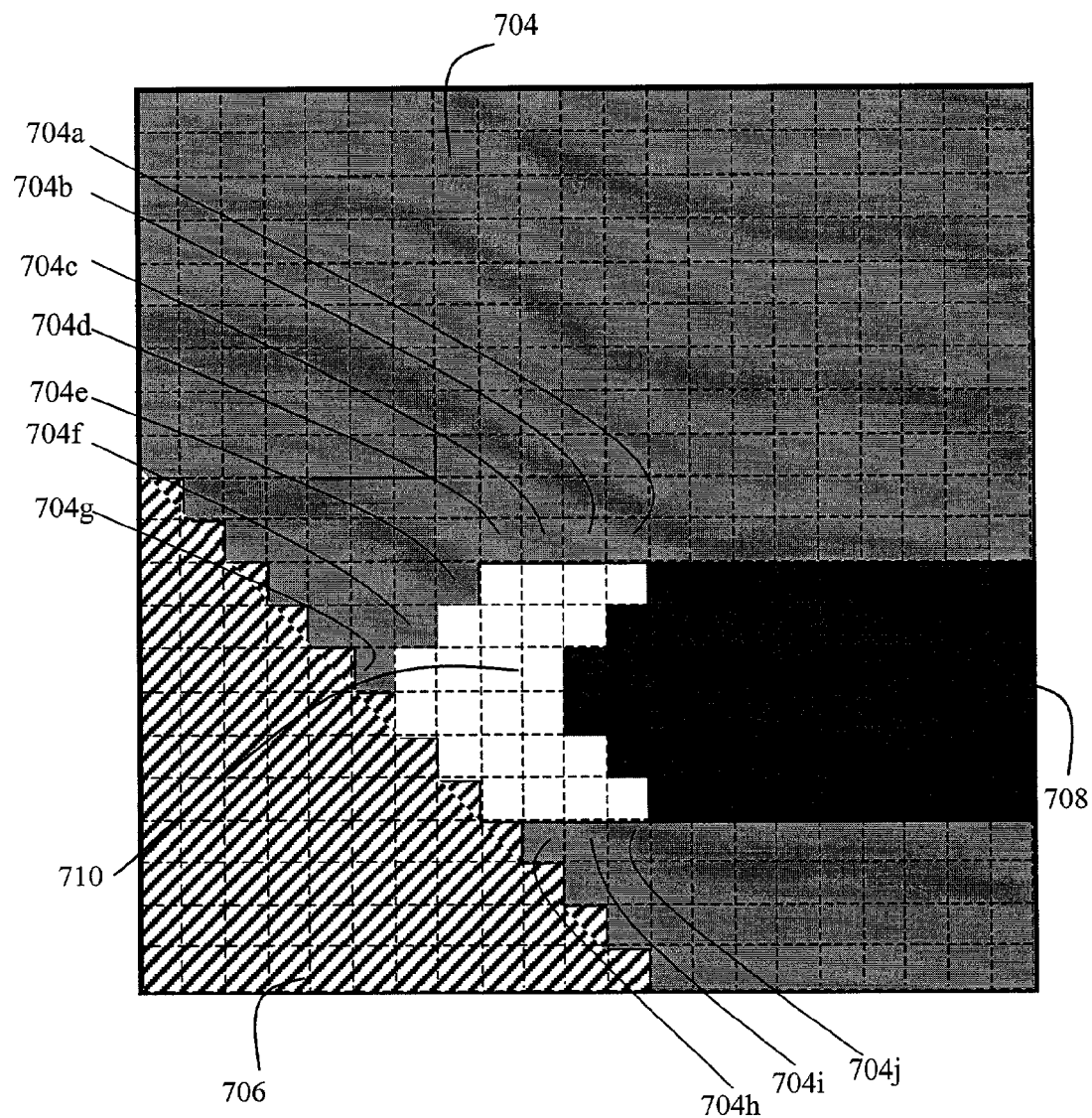
FIG. 7B illustrates the pixels of a fill segment, adjacent to the boundary of an exposed area.
Figure 7C:
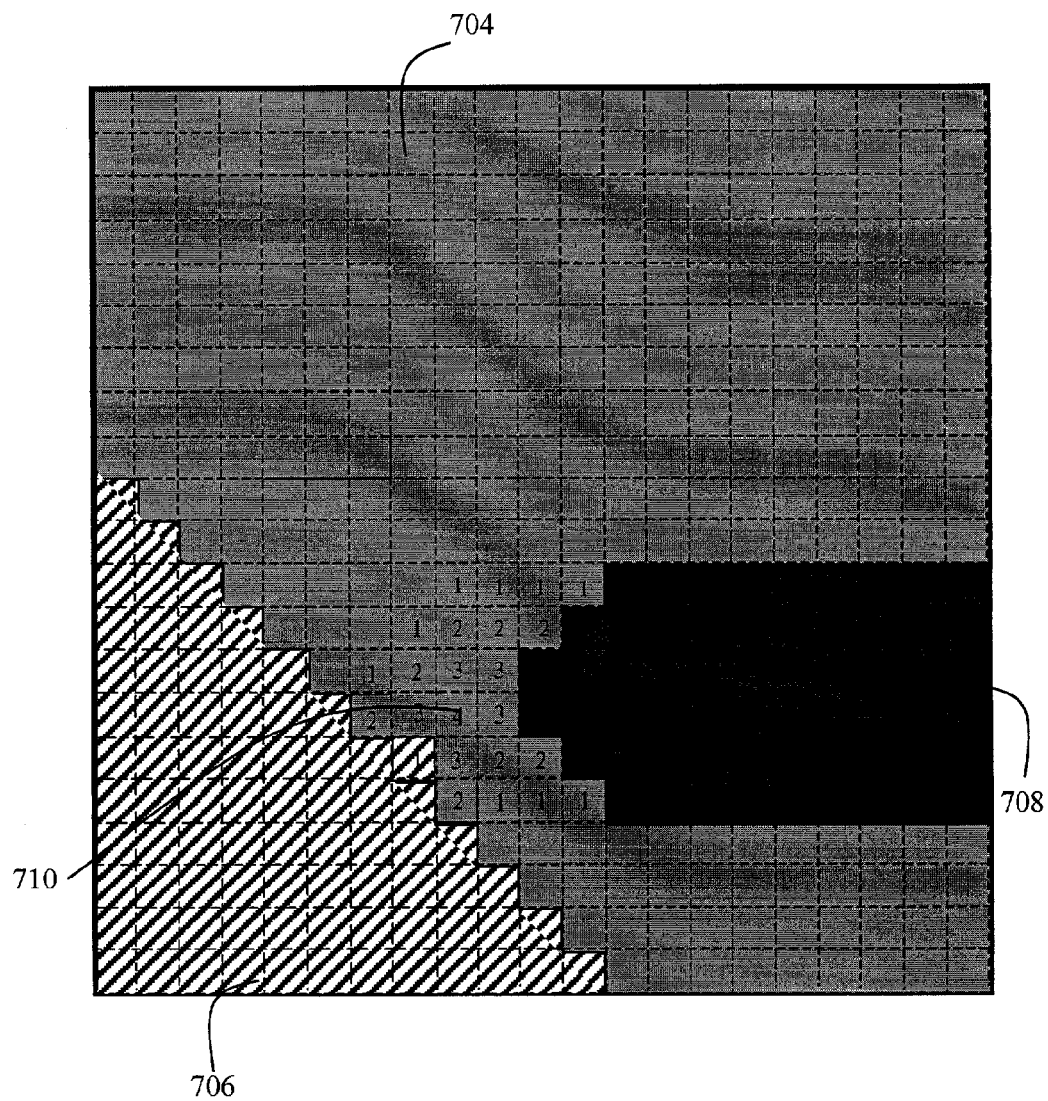
FIG. 7C illustrate the final results of a reference fill routine.

FIG. 7 delineates the steps of choosing a set of fill segment, from within the set of tentative fill segments determined above. In one embodiment of the current invention, the routine calculates the normalized ratio of the squares of the boundary lengths that each of the tentative fill segments shares with the exposed area. Referring to FIG. 7B, the boundary lengths would be the lengths of the pixels that surround the exposed area. For example, for segment 604, the total length of the sides of the pixels 704a, 704b, 704c, 704d, 704e, 704f, 704g, 704h, 704i, 704j that are adjacent to the exposed area 610 is the boundary length that segment 704 shares with 710. Suppose the boundary lengths of each one of n tentative fill segments is denoted by ($L_1$, $L_2$, $L_3$ ..., $L_n$), with their corresponding ratios denoted by lower case 'l', the normalized ratio of squares would be $(l_1^2:l_2^2:l_3^2: \ldots :l_n^2)$, where, $(l_1^2+l_2^2+l_3^2+ \ldots +l_n^2)=1$ The routine then calculates the normalized ratio of the areas of the filled regions contributed by each of the boundary segments. Referring to FIG. 7C, the region of exposed area 710 filled by segment 704 is shaded in gray and marked with the numbers the number 1, 2 3 or 4. The regions filled by segment 706 is shaded in stripes and marked with the number 1. Suppose the areas contributed by each one of n tentative fill segments is denoted by ($S_1$, $S_2$, $S_3$ ..., $S_n$), with their corresponding ratios denoted by lower case 's', the normalized ratio of areas would be, $(s_1:s_2:s_3: \ldots :s_n)$ where $(s_1+s_2+s_3+ \ldots +s_n)=1$ The routine then calculates a quantity or a score where the score is the sum of the absolute value of the difference between the normalized ratios, Score=$\Sigma_1^n |(S_n-l_n^2)|$ In the next step, the routine rejects the segment where the value obtained by subtracting the normalized area from the normalized length squared i.e., $(l_n^2-S_n)$ is the greatest. Having removed the segment, the remaining ratios are renormalized and the score is recalculated. If this recalculated score is less than the previous score, the routine again removes the value of the segment where $(l_n^2-S_n)$ is the greatest and recalculates. This process is repeated until the recalculated score is greater than the previous score. The segments used to calculate the lowest score are then selected as the fill segments.

In other embodiments a different function of the boundary lengths and area contributed by each of the segments may be used to determine the fill segments.

Predictive Filling:

Using the set of fill segments, a predictive filling routine is carried out next. Predictive filling carries out the filling procedure in the same way that a decoder would carry out filling. One important difference between predictive filling and reference filling is that in predictive filling, the predicted pixel values are not compared with the actual values of the corresponding pixels. In use, an image decoder will have the final task of filling in the exposed area and it will not have the information about the actual values of the pixels within this area and thus must perform the final task of filling in the exposed area based upon information readily available or information transmitted by the encoder. Hence the purpose of carrying out this routine is for an encoder to be able to estimate the result, that an exemplary decoder may produce when filling in the exposed area using information from the fill segments alone. The ultimate purpose of the predictive filling routine is to determine whether the segments chosen as fill segments can reasonably approximate the actual color values of the pixels above.

Figure 8:
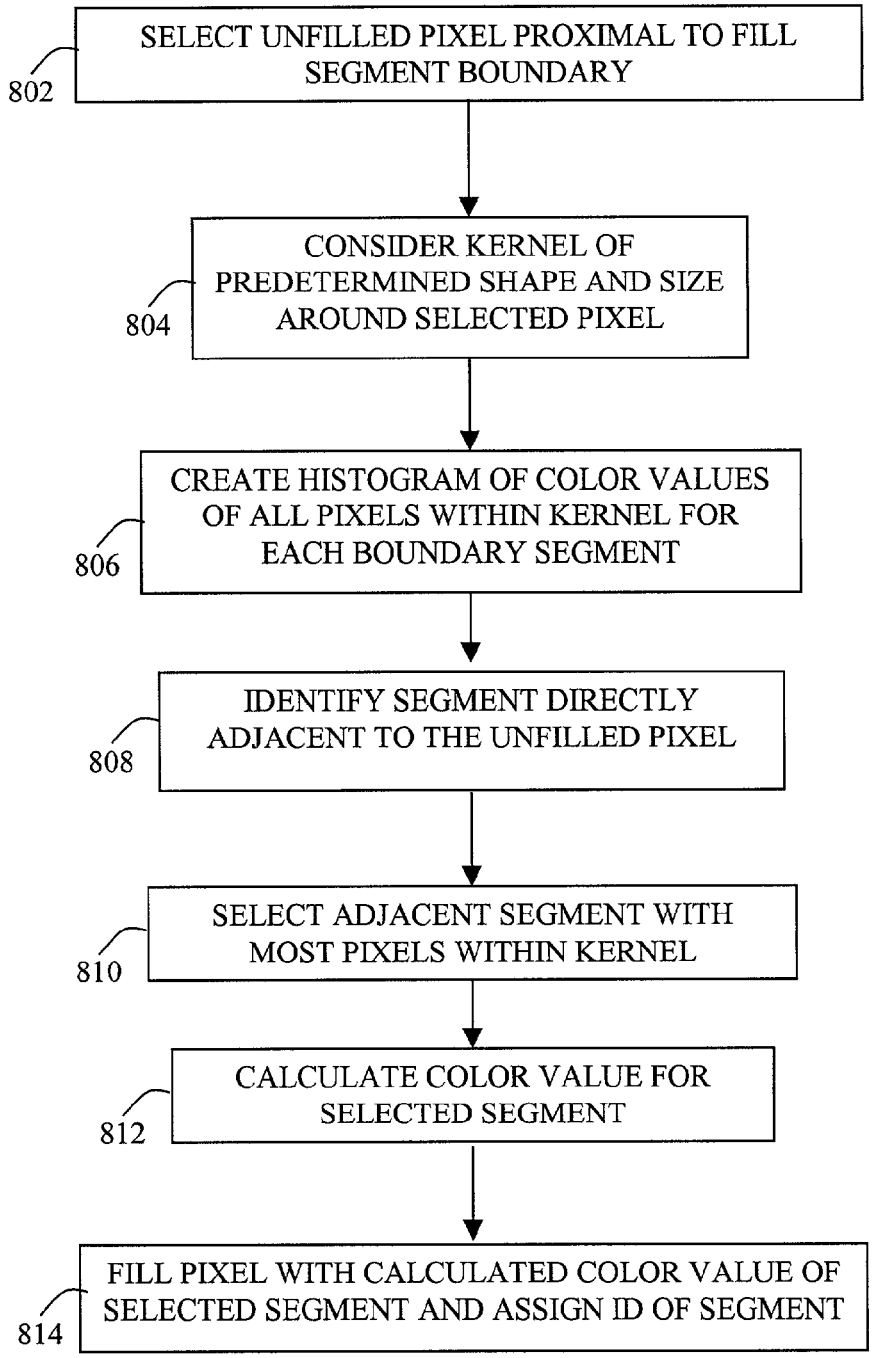
FIG. 8 illustrates the steps of a predictive filling routine.

FIG. 8 delineates the steps of predictive filling. The routine begins with taking each pixel that is most proximal to the edge of the exposed area (802) and considering a kernel of adaptive size around it (804). The domain of such a kernel 912 can be seen in FIG. 9C around the pixel 999 at the edge of the exposed area. Next the routine creates a histogram of color values of all pixels within the kernel for each fill segment (806). For each segment there will be a histogram of color distribution for each of the color components Y, U and V. In other embodiments, a different set of histograms for other spectral components of the video image frame is also envisioned. The routine identifies the segment adjacent to the pixel (808). If there is more than one segment adjacent to the pixel then the routine determines which segment contributes more pixels to the kernel (810). Then the routine calculates a statistical parameter of the color values for the adjacent fill segment (812). In one embodiment the statistical parameter calculated is the median, however in other embodiments, measures such as but not restricted to mean, mode, the weighted mean or any other statistical moment of the distribution may also be used. The pixel is then filled with the value of the calculated statistical parameter and the pixel is assigned the segment identifier of the adjacent segment (814). For example, in FIG. 9C, pixel 999 will be filled with the color value calculated from the pixels of segment 904 that overlap with kernel 912.

FIG. 9 A–I and FIG. 10 A–I illustrate the steps of predictive filling. In particular FIG. 9 shows the results of filling using segments 904 and 906 as fill segments. FIG. 10, in contrast, illustrates the steps of filling from segment 1004 only (904 in FIG. 9). As these examples will show, filling from segment 904 alone creates a better approximation of the actual color scheme of the exposed area, than the results obtained by filling from both segments 904 and 906. The results demonstrate the importance of selecting the correct segments for filling an exposed area.

Figure 9A:
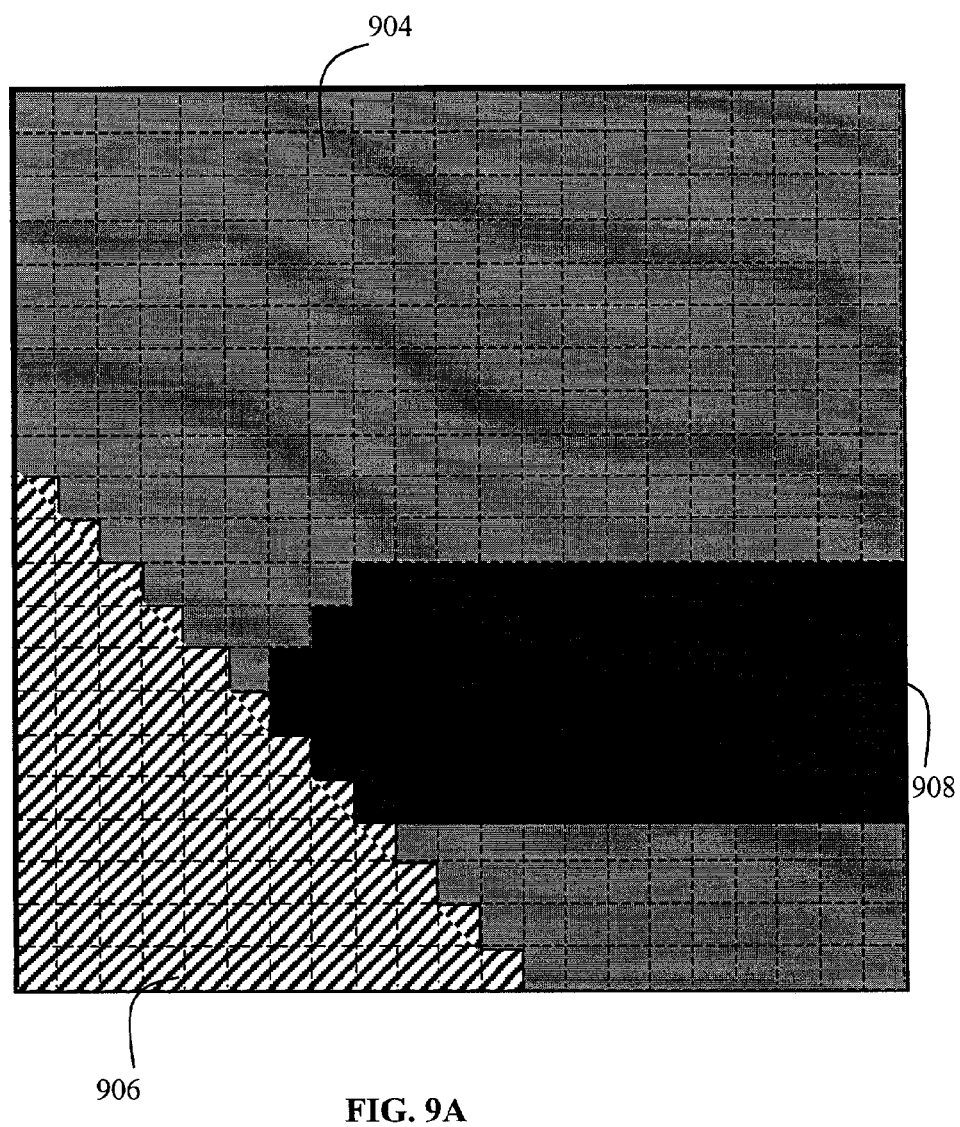
FIG. 9 A–I illustrate the steps of predictive filling using a set of fill segments that does not produce an accurate reconstruction of the exposed area.
Figure 9B:
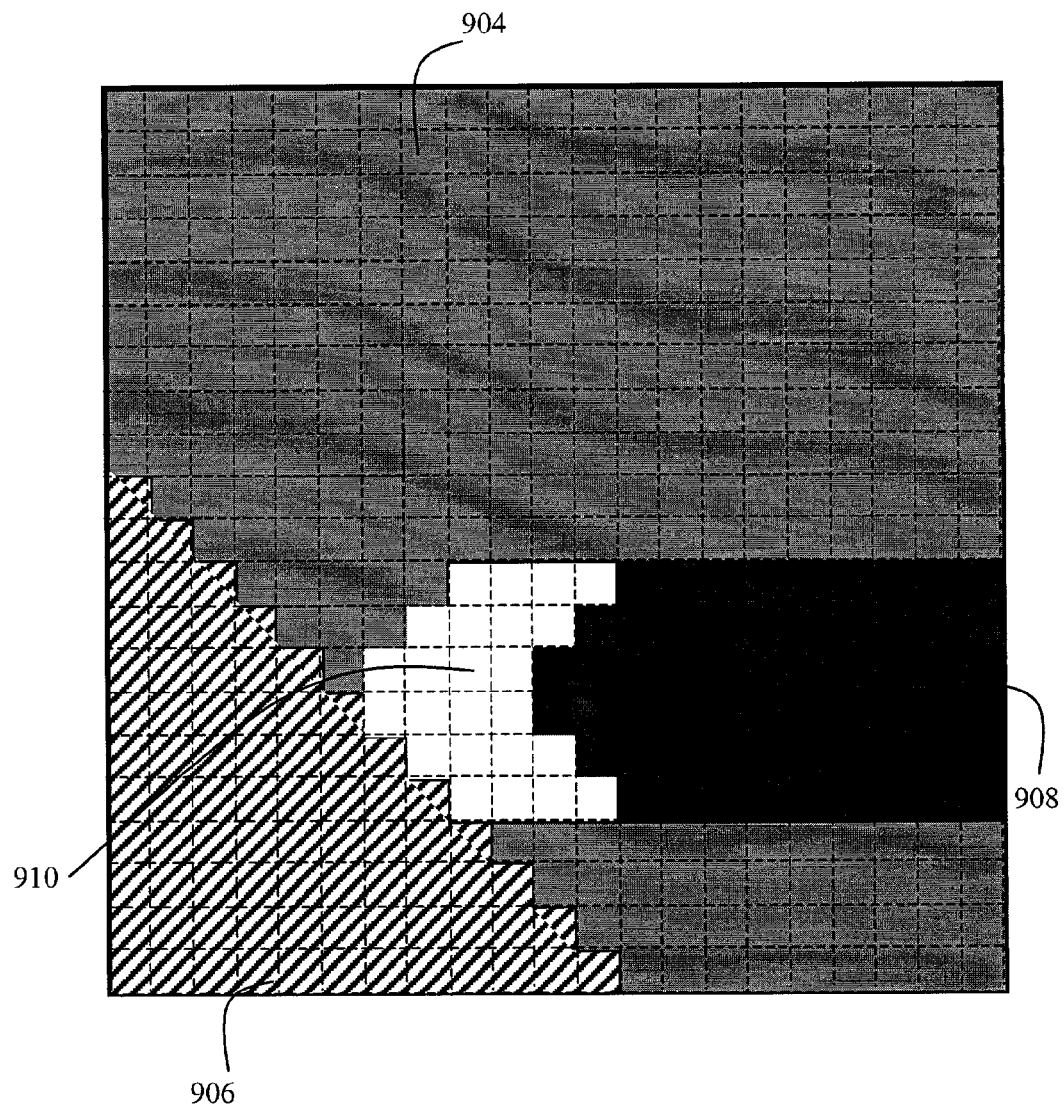
Figure 9C:
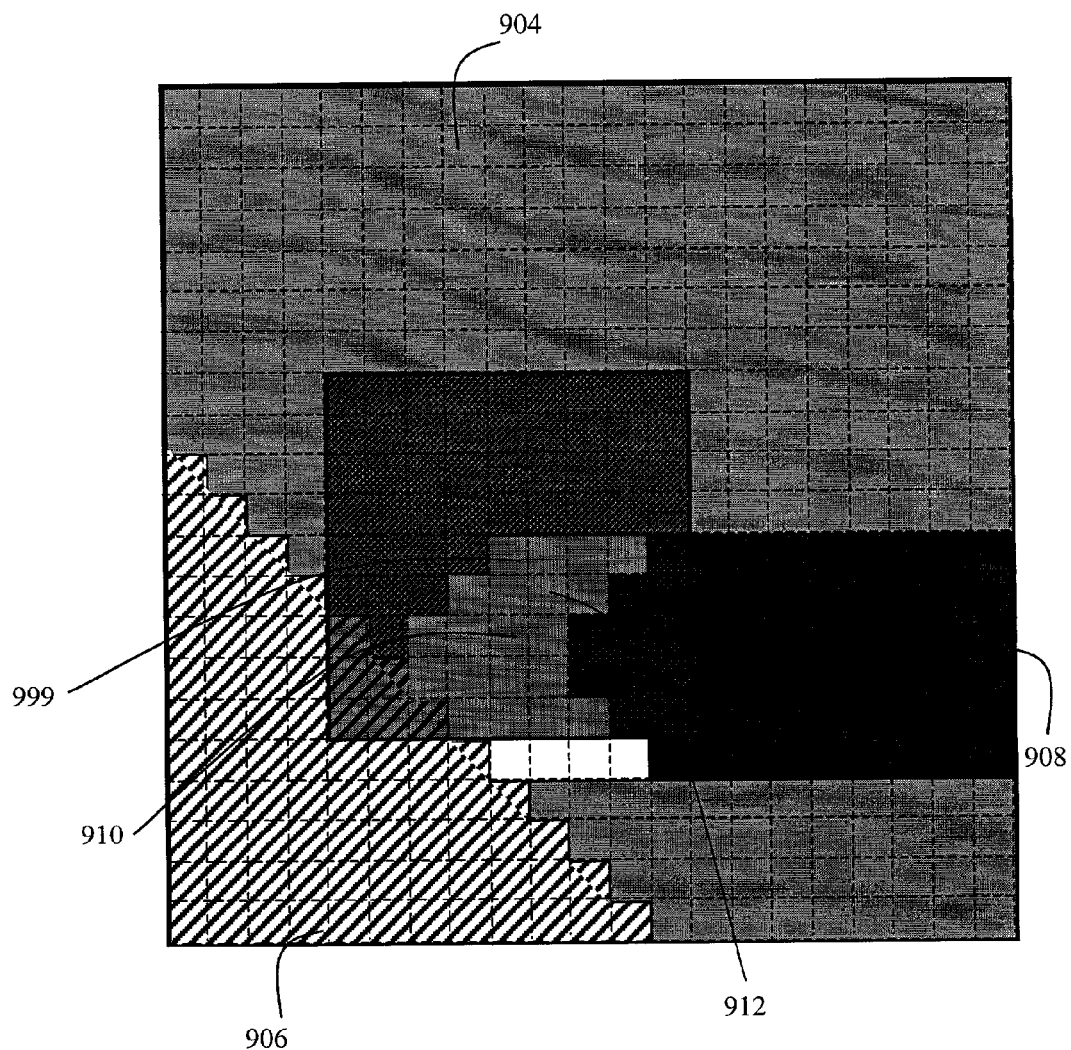
Figure 9D:
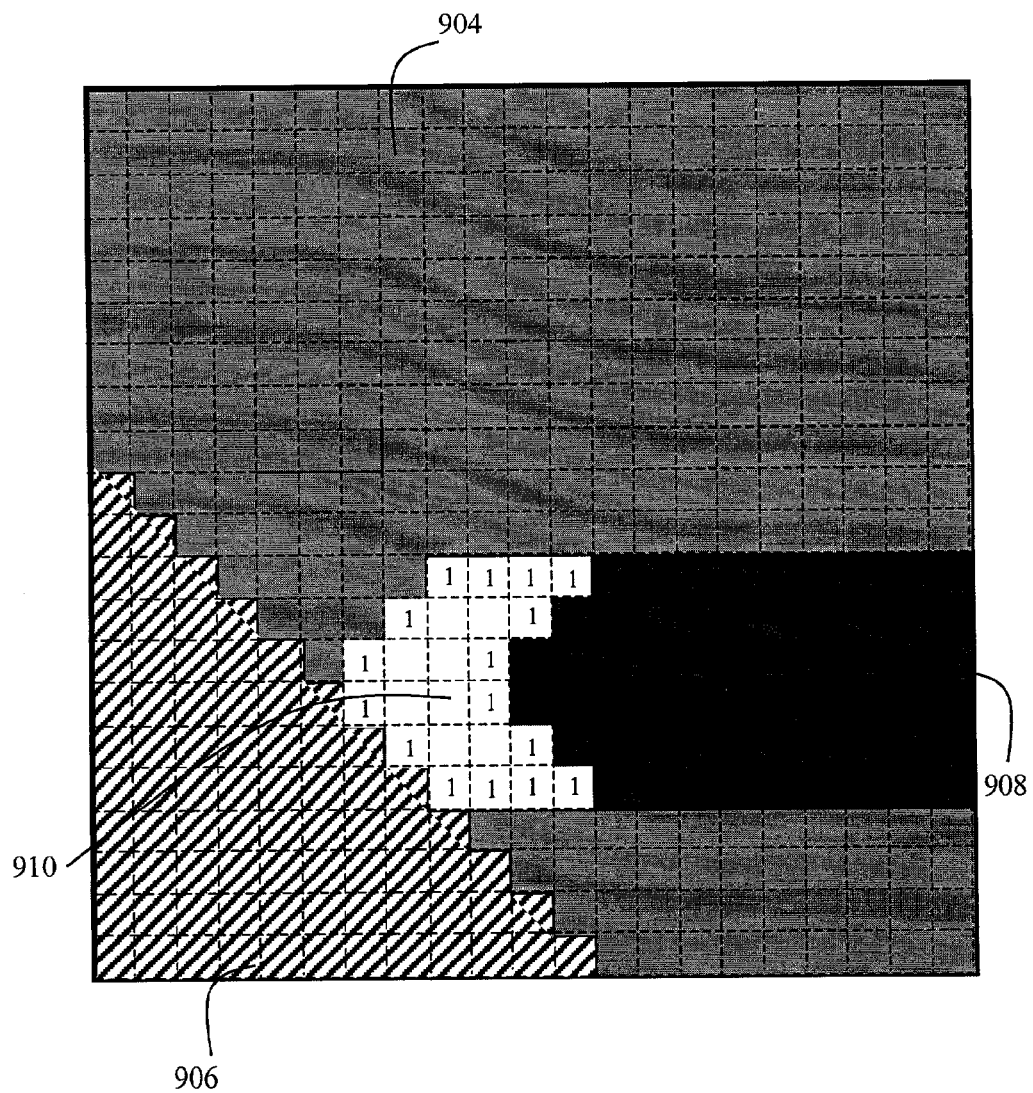
Figure 9E:
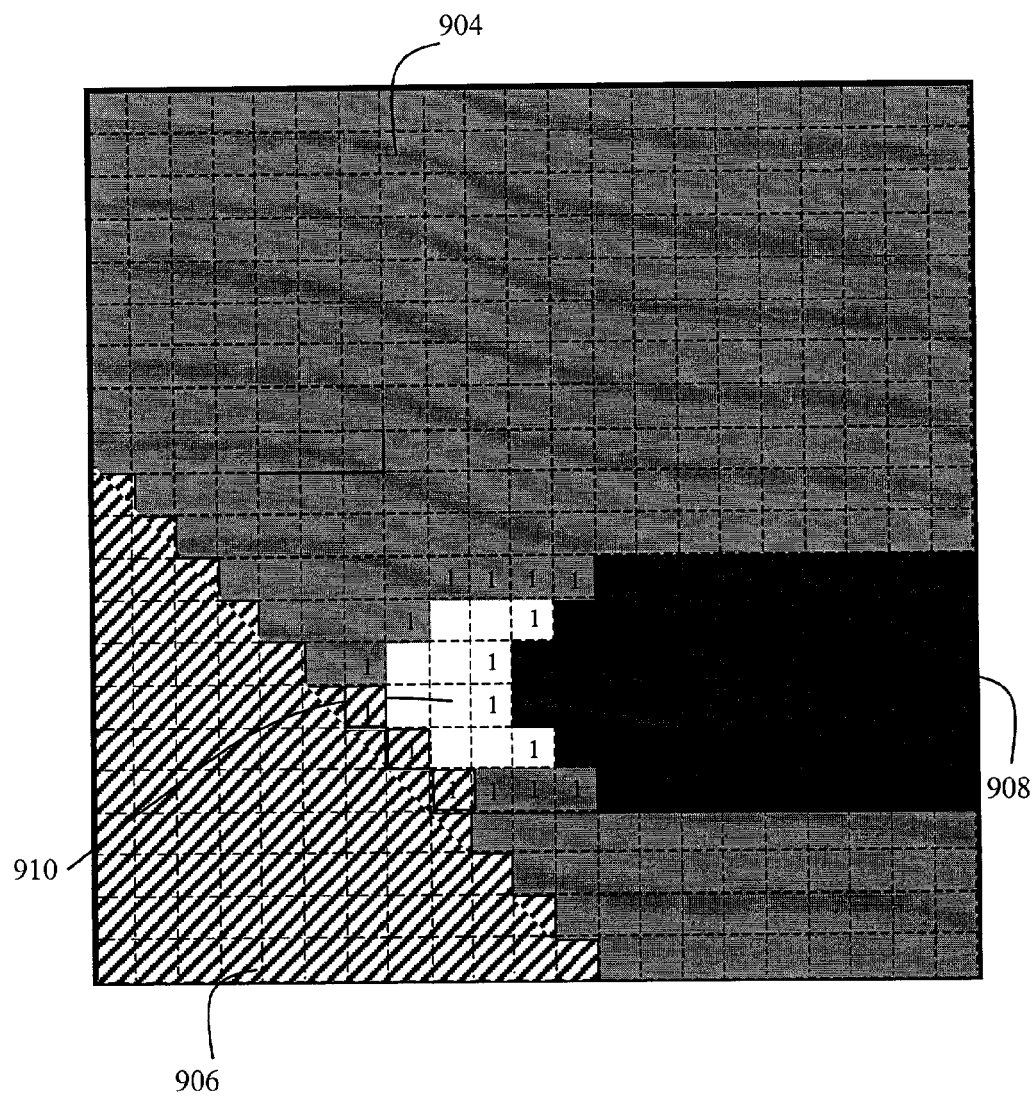
Figure 9F:
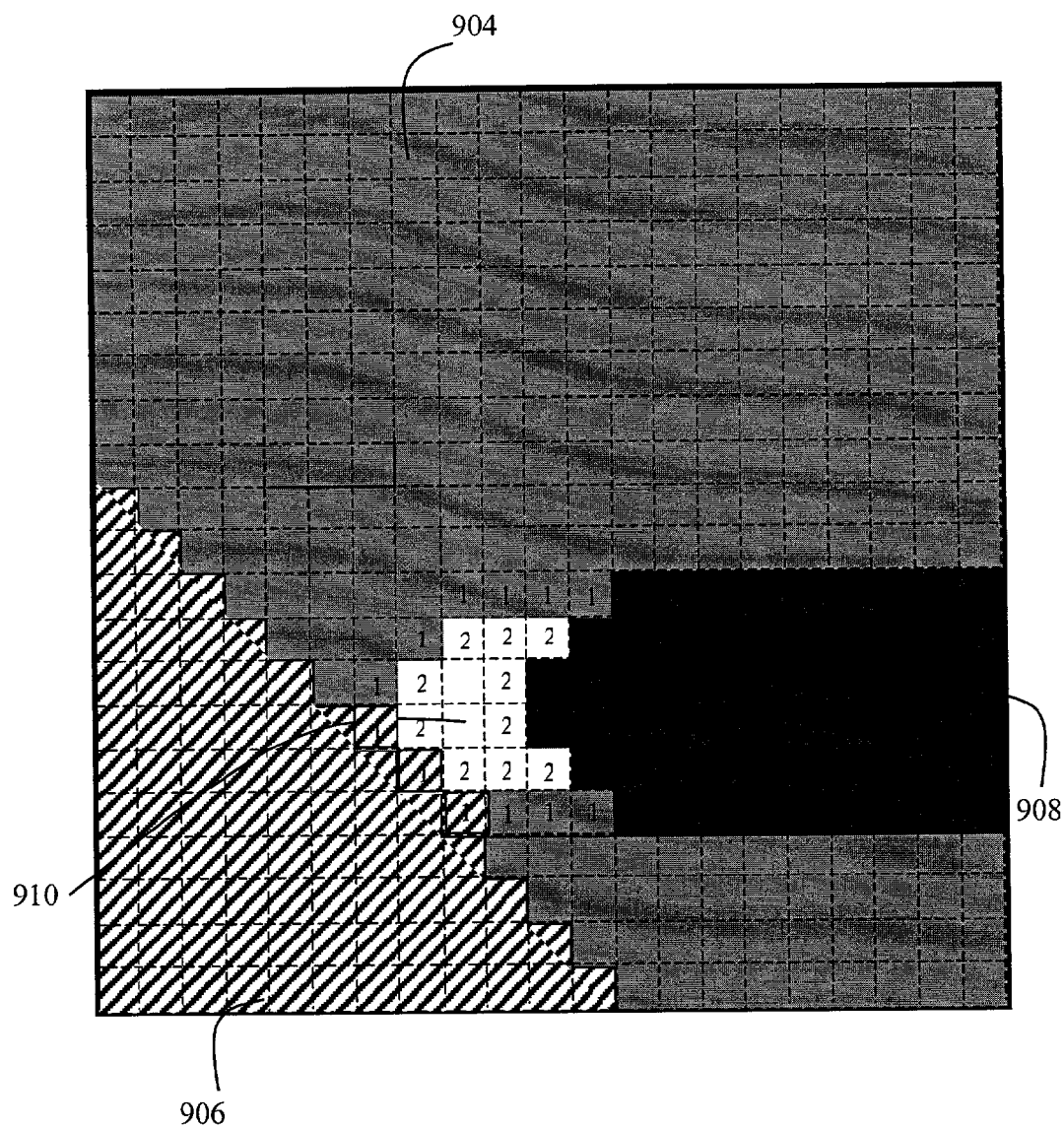
Figure 9G:
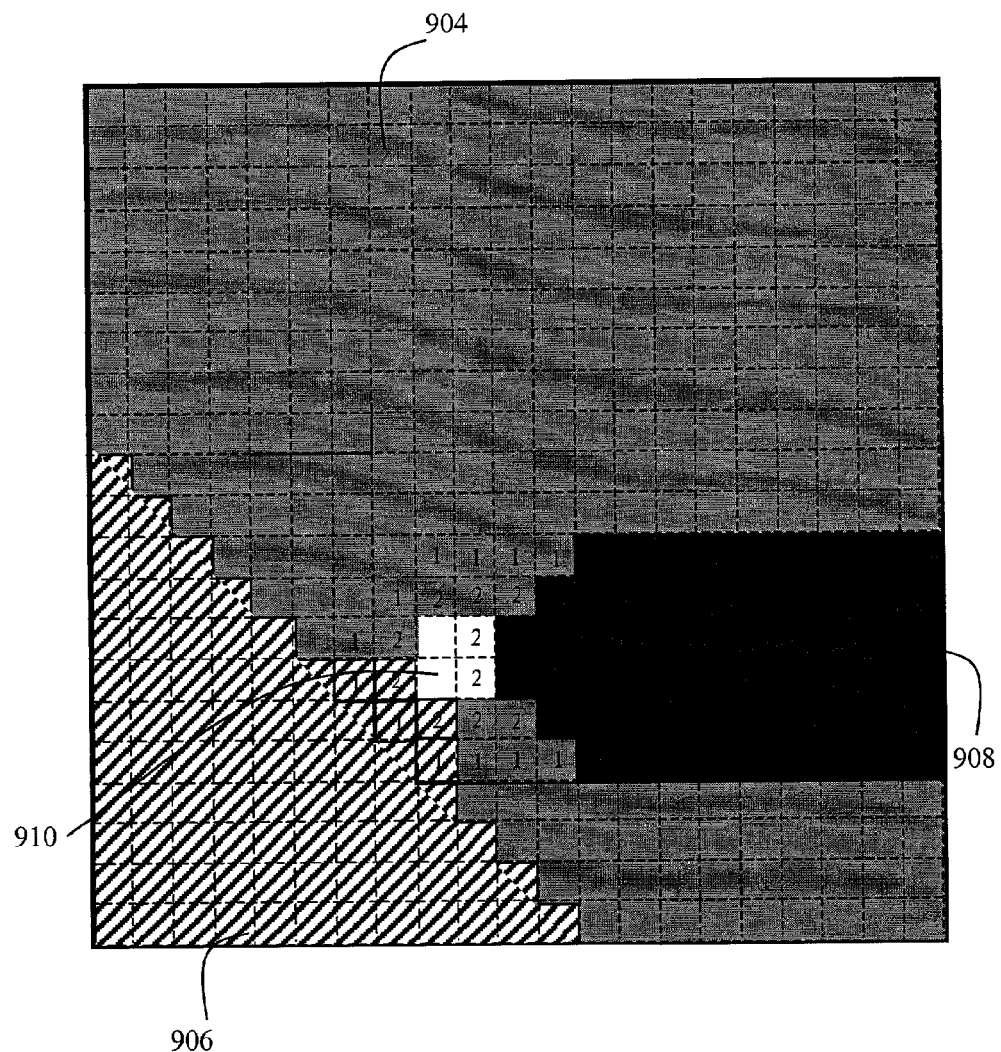
Figure 9H:
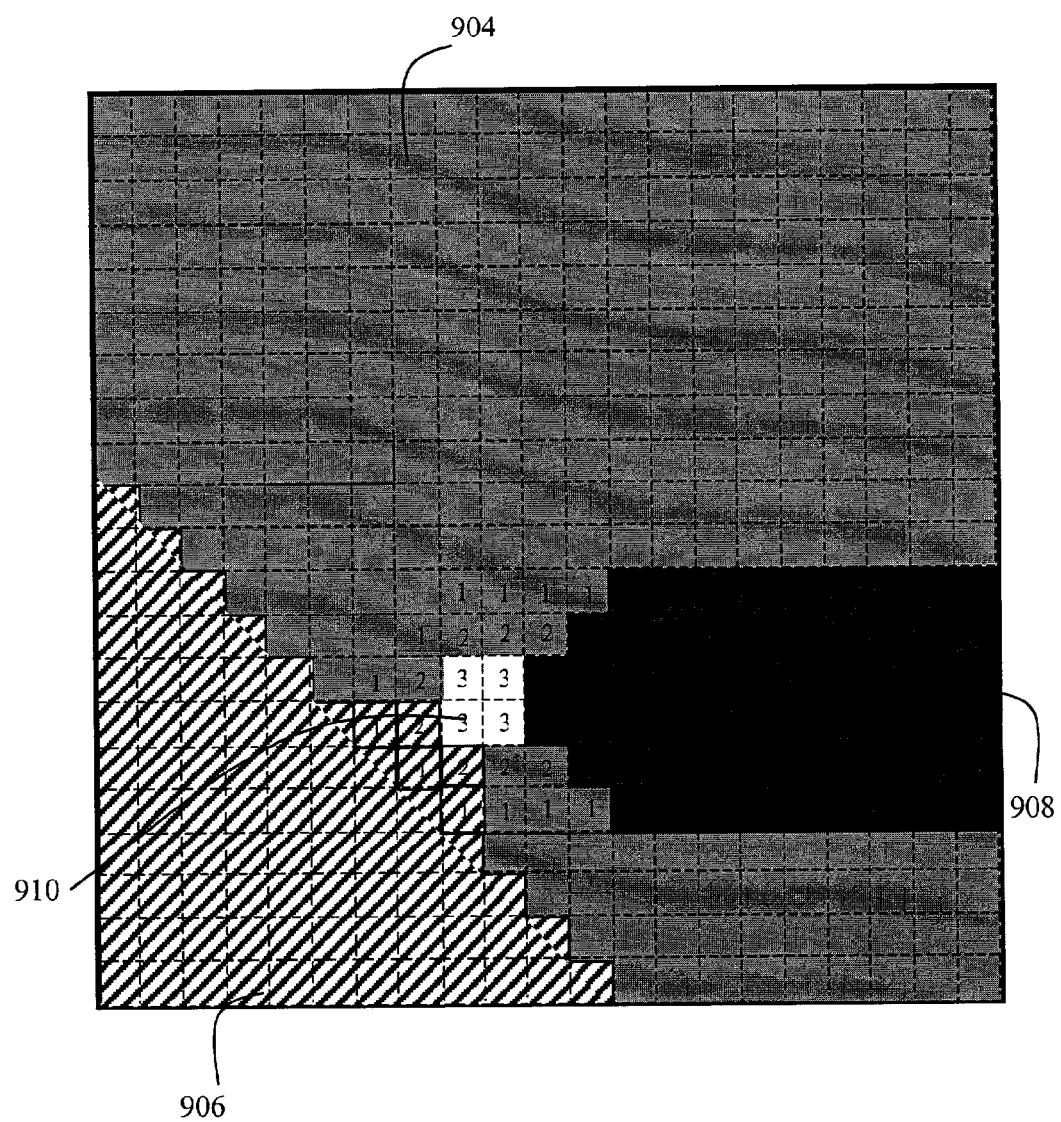
Figure 9I:
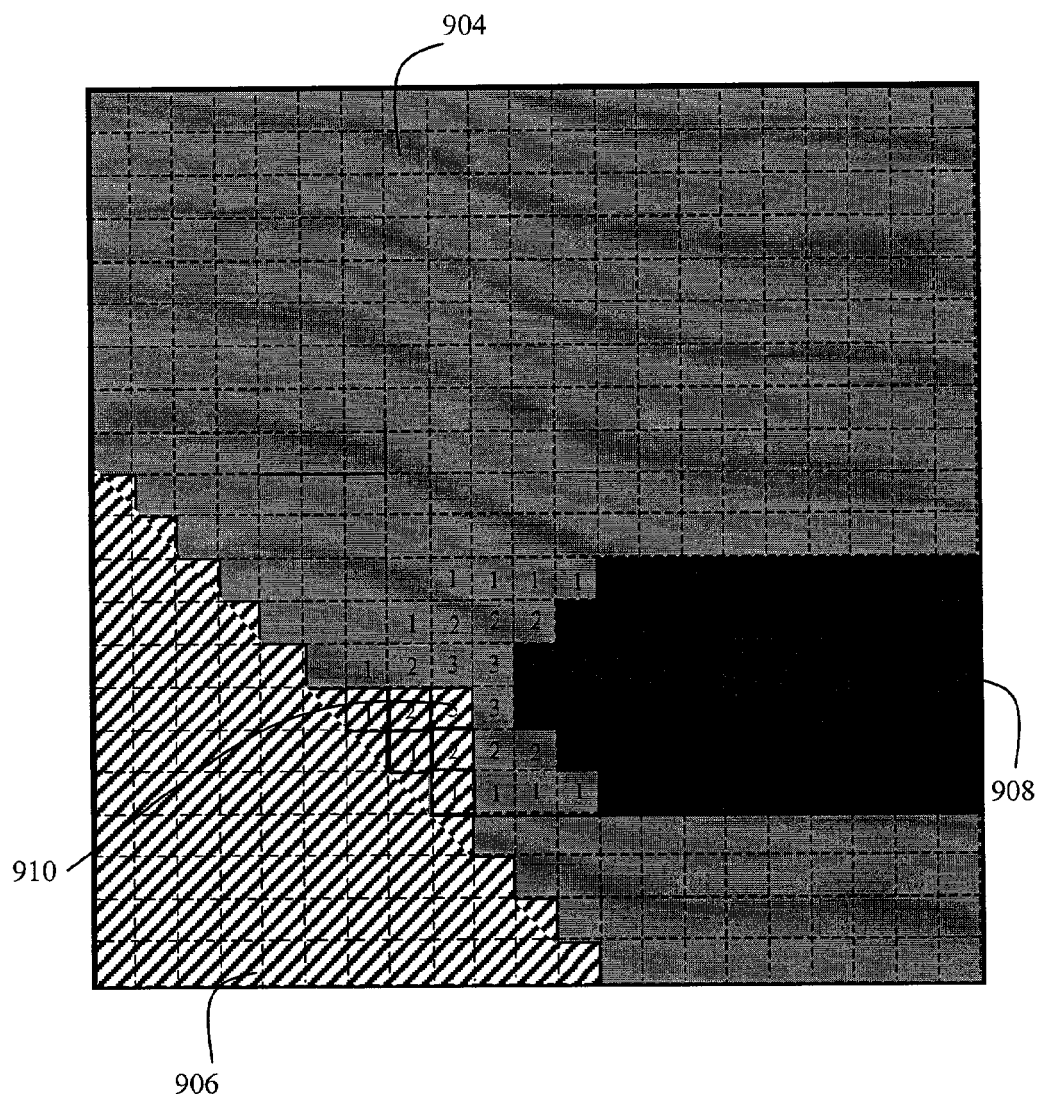
Figure 10A:
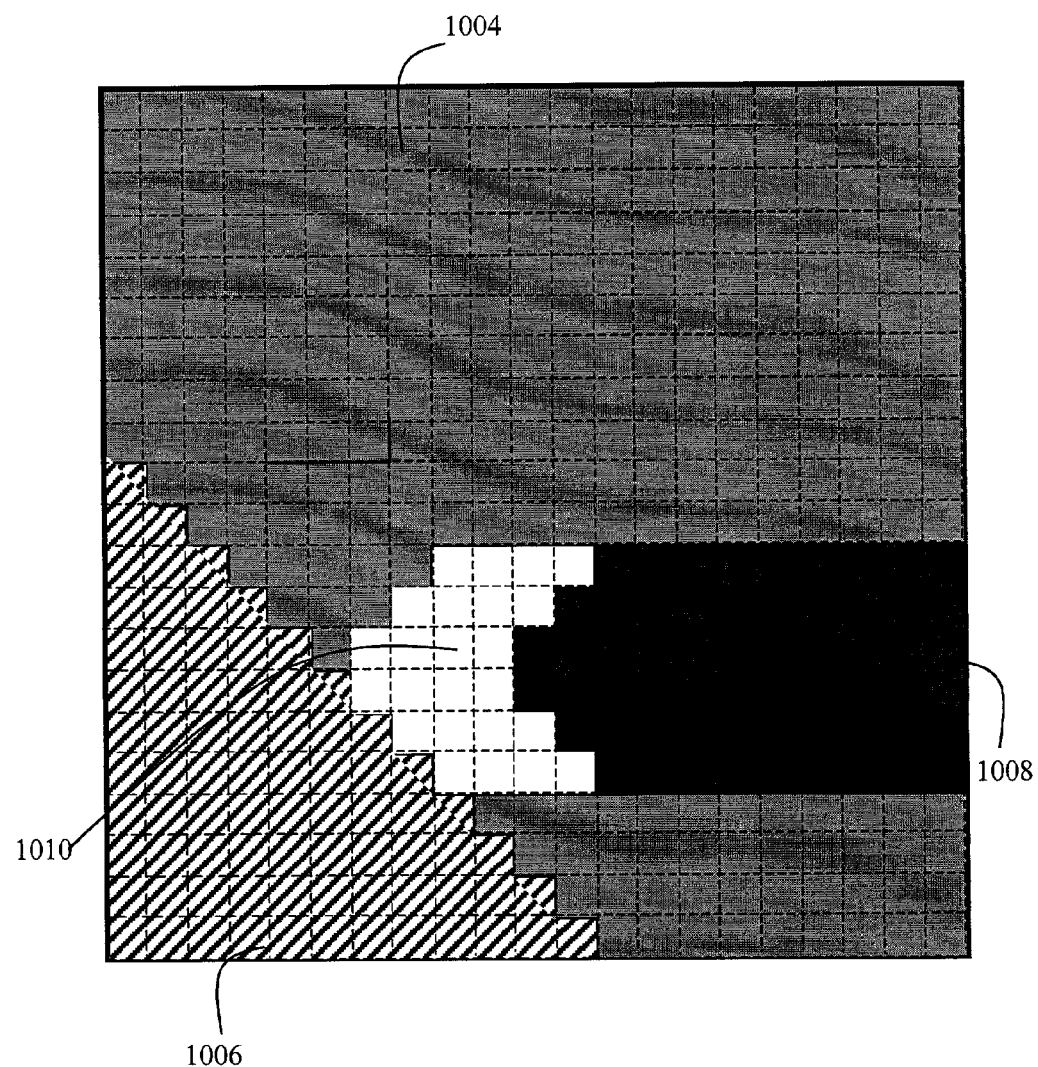
FIG. 10 A–I illustrate the steps of predictive filling using a set of fill segments that produce a better reconstruction of the exposed area.
Figure 10B:
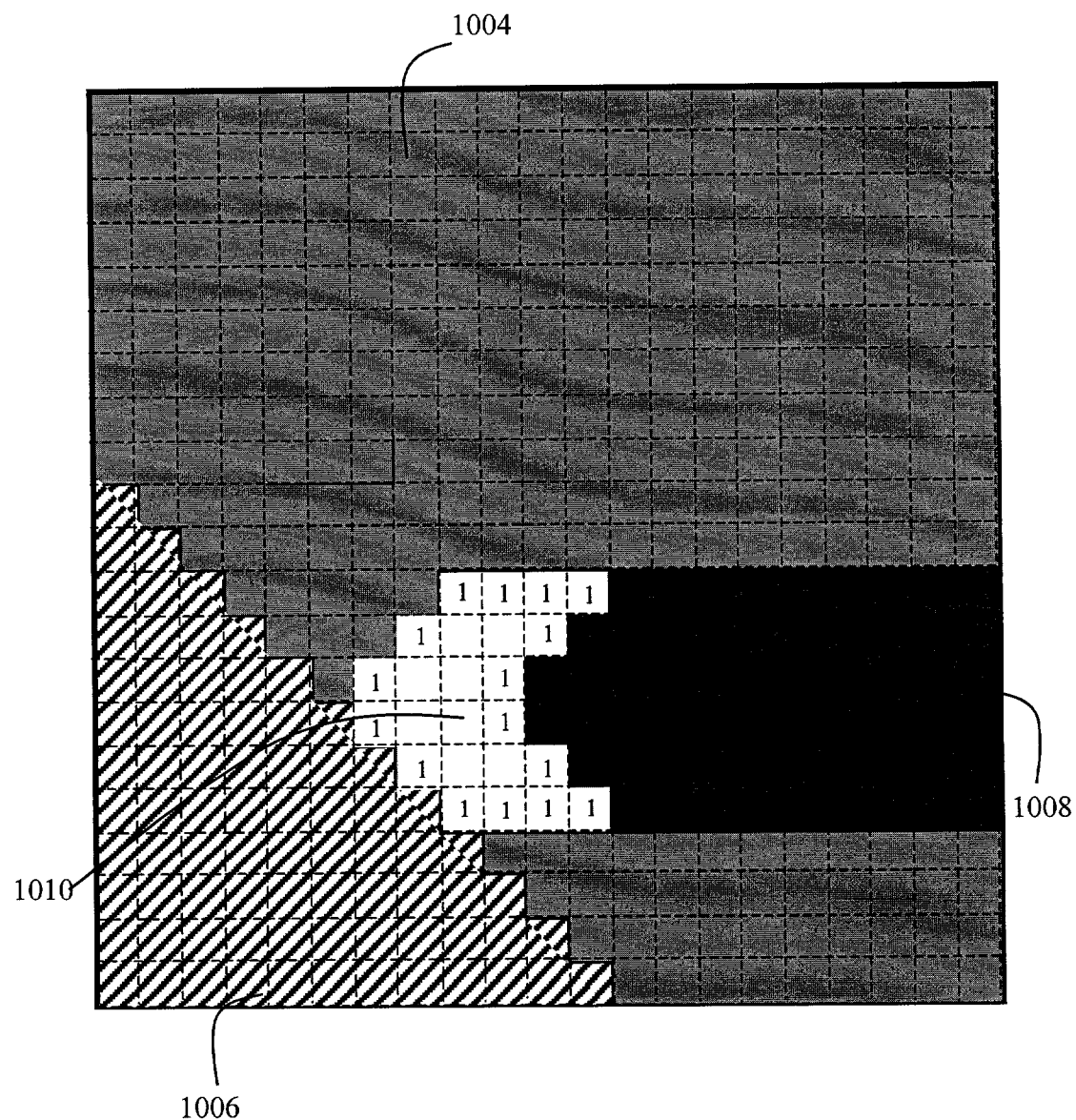
Figure 10C:
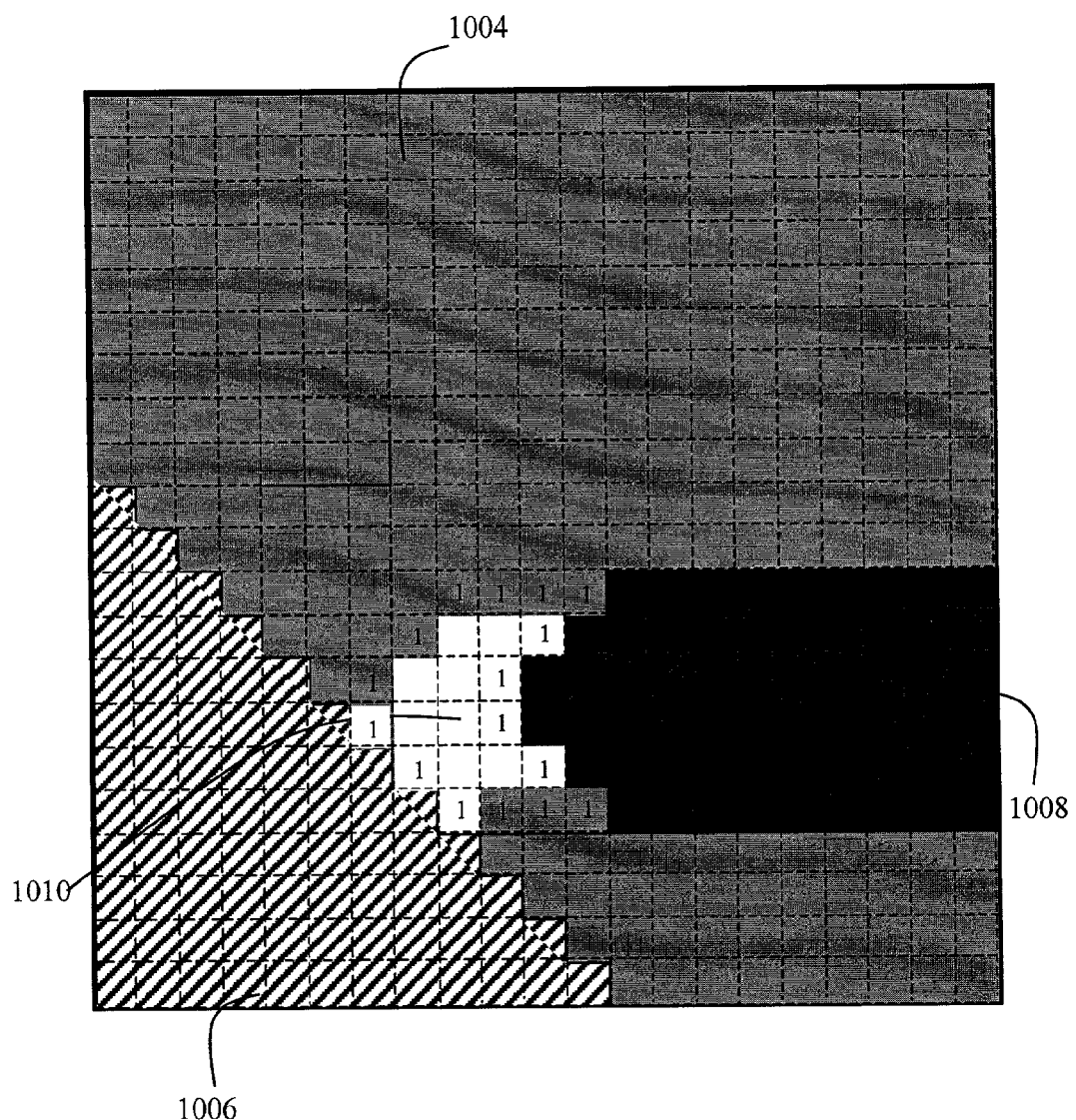
Figure 10D:
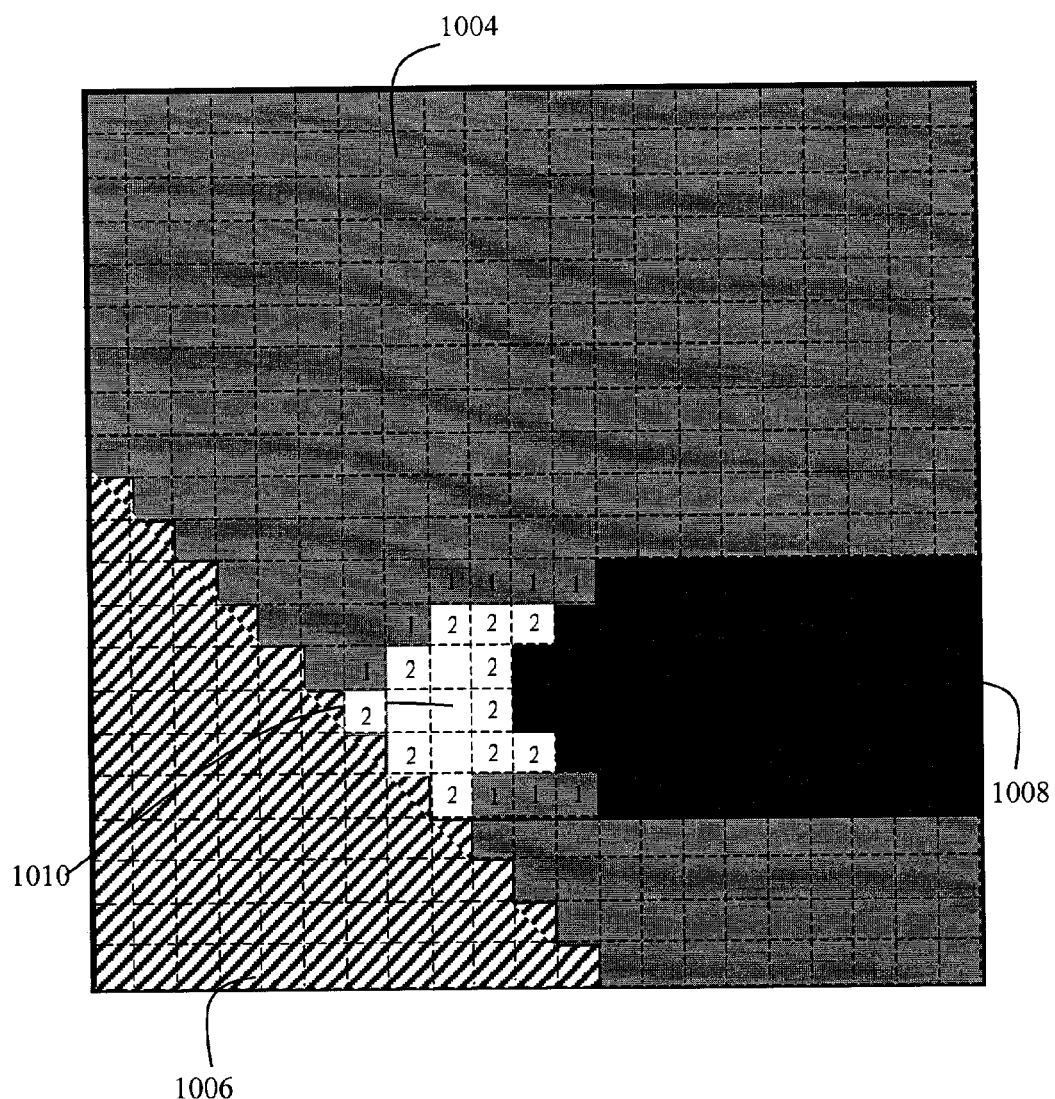
Figure 10E:
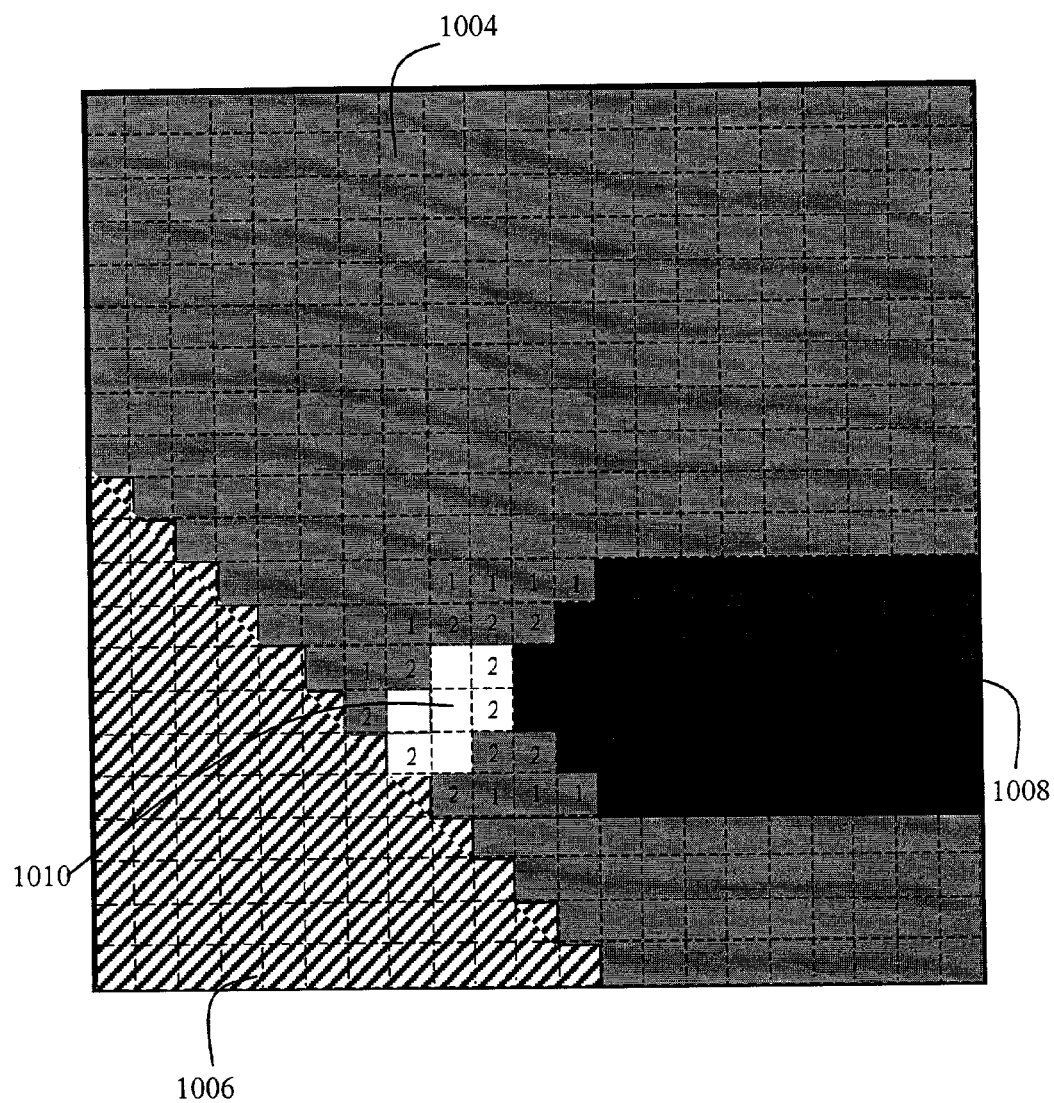
Figure 10F:
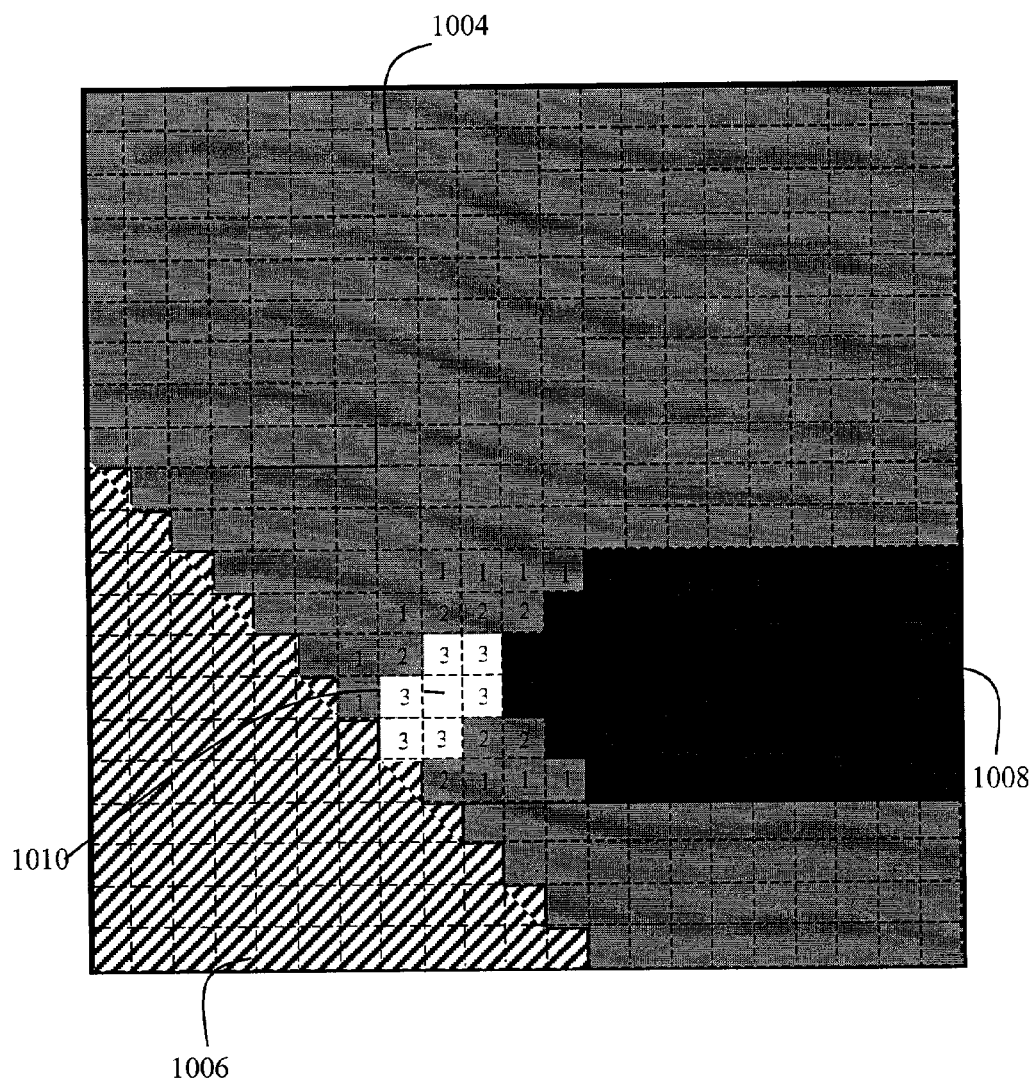
Figure 10G:
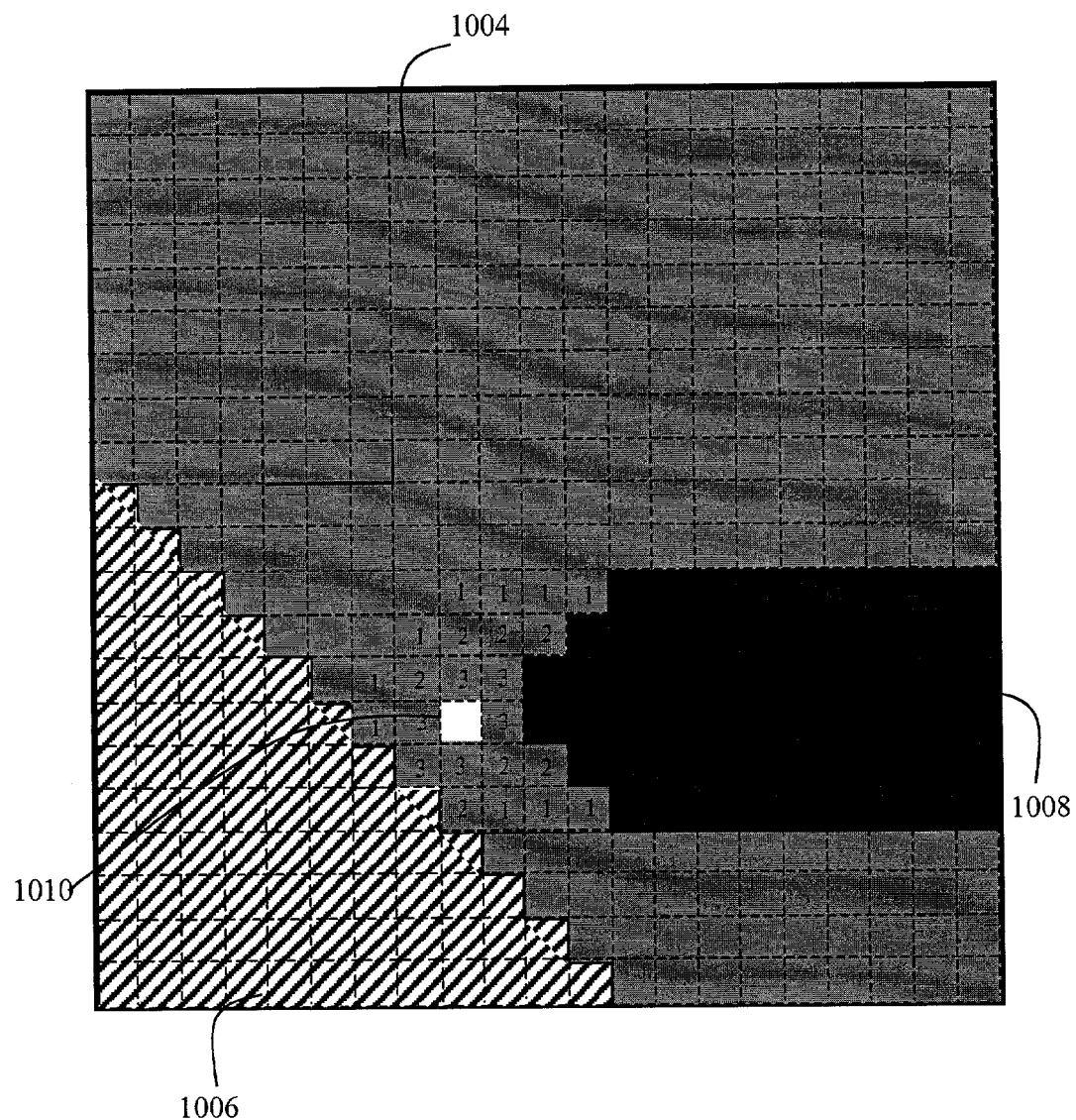
Figure 10H:
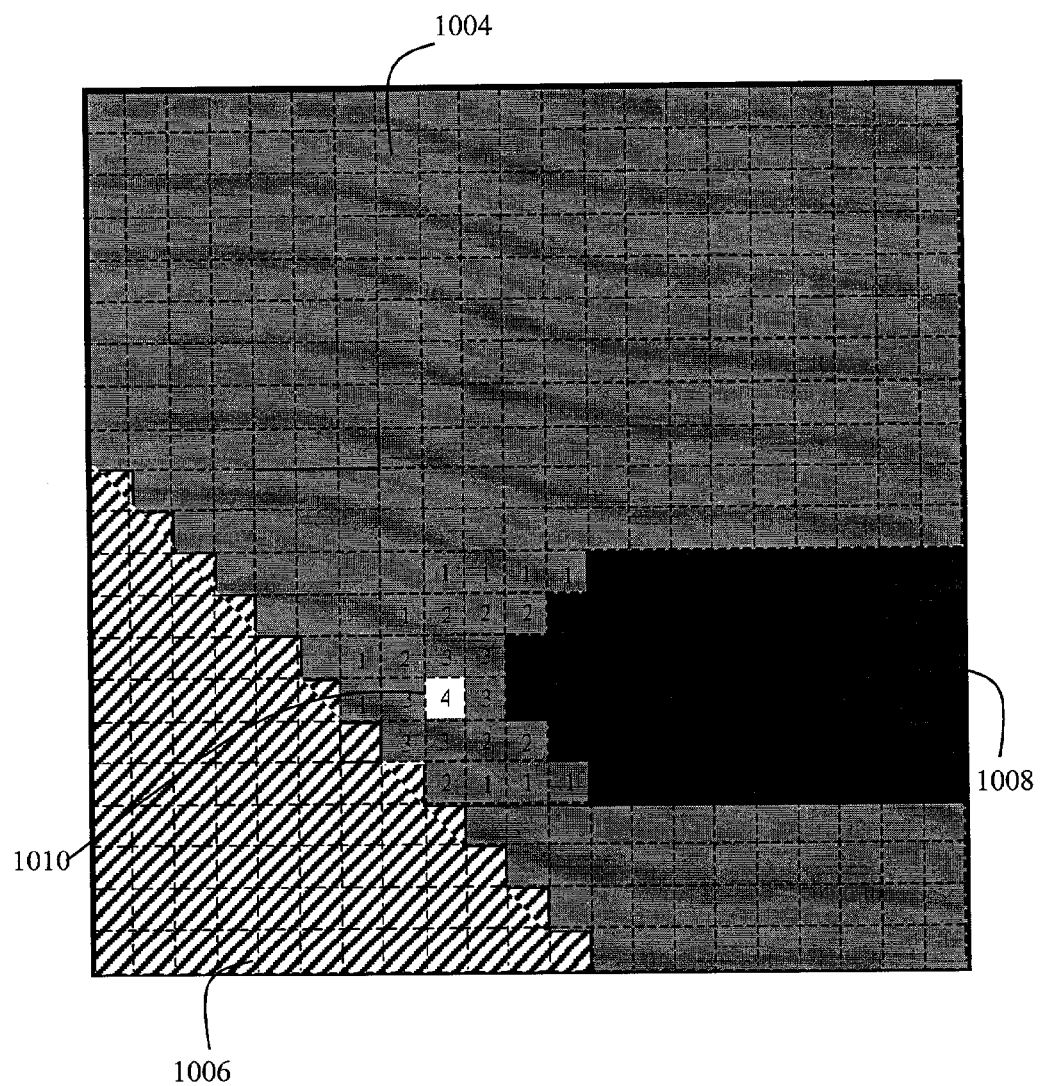
Figure 10I:
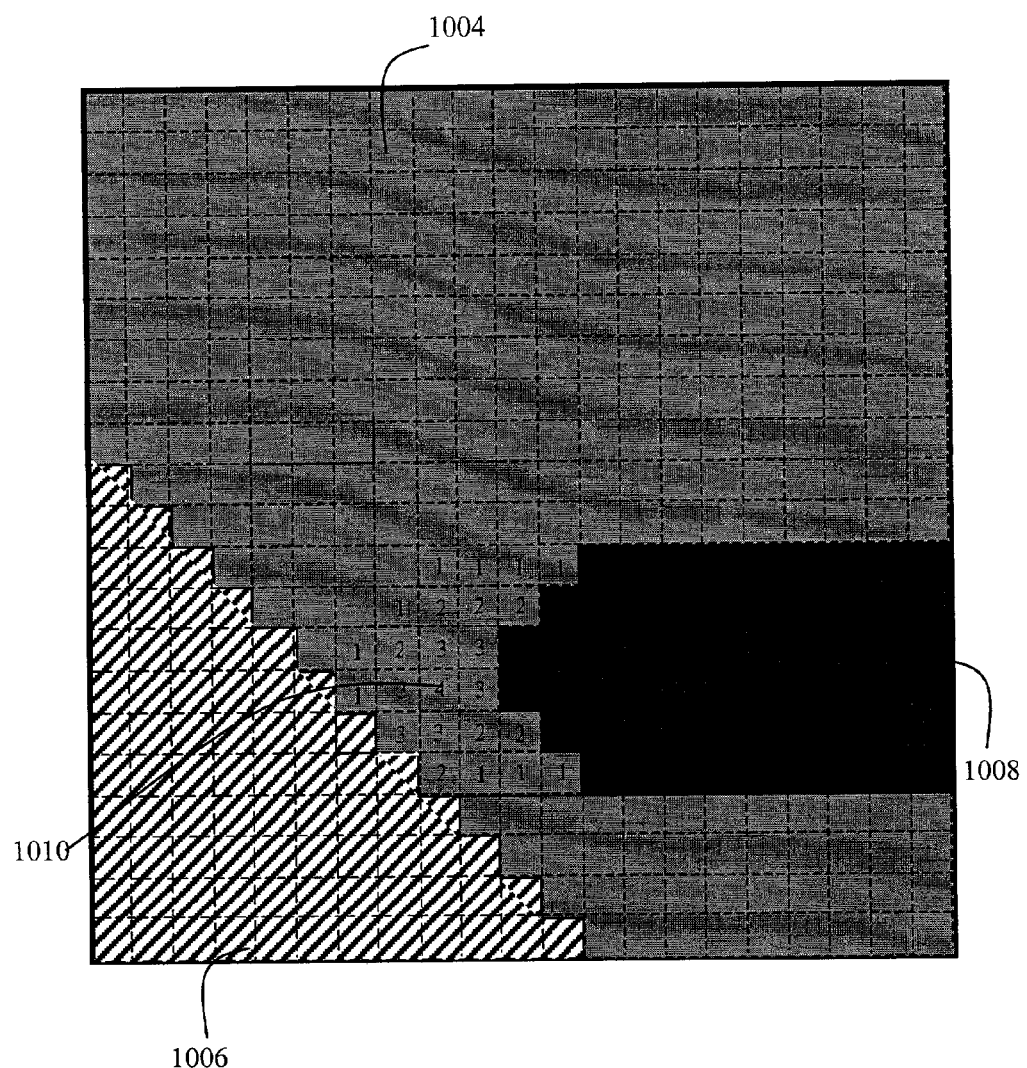

FIG. 9A illustrates the first image frame, which contains three segments 904, 906 and 908. FIG. 9B illustrates frame 2 after the motion of the segment 908 where an exposed area 910 is visible. It is important to note here that this frame is not the actual image frame. This is an intermediate step in the process of reconstruction of the image frame after the motion of the segment 908. In the subsequent steps the routine will attempt to reconstruct the actual image frame by predicting the color values of the pixels in the exposed area. As mentioned earlier, FIG. 9C shows the kernel 912 around the pixel 999. FIG. 9D illustrates the first ring the pixels within the exposed are to be filled; therein the first ring of pixels at the boundary of the exposed area are denoted by 1. FIG. 9E illustrates the results of the filling of the first ring using the method described in FIG. 8 for each pixel at the boundary. It is important to note here that since segments 904 and 906 have been chosen as fill segments, the pixels adjacent to segment 908 are left unfilled. As can be seen in FIG. 9F, during the filling of the next ring, these unfilled pixels will become parts of ring 2. FIG. 9F illustrates the pixels that belong to the second ring as marked by the number 2 within the exposed area 910. FIG. 9G illustrates the results of filling of ring 2. Once again the two unfilled white pixels marked 2 will become part of the third ring as can be seen in FIG. 9H. FIG. 9H illustrates the pixels of the third ring labeled 3 within the exposed area 910. FIG. 9I illustrates the final results of the predictive filling. When this result is compared to the actual image frame as illustrated in FIG. 4B, one can see that filling from segments 904 and 906 produced a poor approximation of the actual color values of the exposed area in FIG. 9I.

Figure 6:
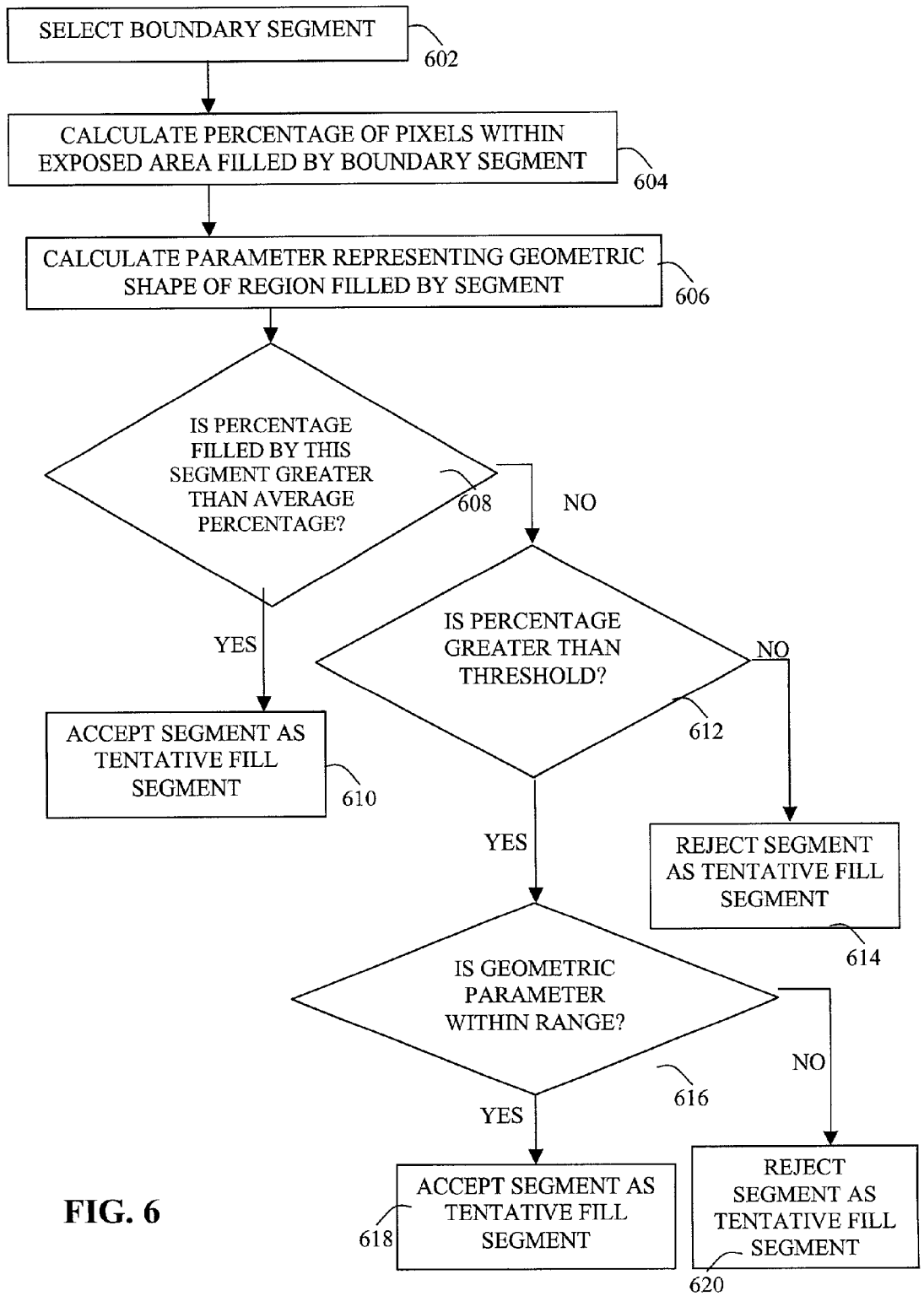
FIG. 6 illustrates the steps of determining a tentative fill segments.

In practice the steps of selecting fill segments would reject segment 906 as a fill segment based upon the criteria described in the section titled 'determining fill segments' and illustrated in FIG. 6 and FIG. 7. Briefly this segment would be rejected since it does not fill a minimum percentage of pixels of the exposed area. The determination criteria in the current example would leave only one segment 904 as the fill segment.

FIG. 10 A–I illustrate the steps of filling from segment 1004 only (904 in FIG. 9). FIG. 10A illustrates the four segments 1004, 1006, 1008 and the exposed area 1010 (identical to FIG. 9A). FIG. 10B illustrates the first ring of the exposed area where the pixels of the first ring are labeled 1. FIG. 10C illustrates the results of filling the first ring using only segment 1004 as the fill segment. It is worth noting that the three pixels labeled 1 adjacent to segment 906 have remained unfilled because 904 is the only fill segment and the routine only allows filling from adjacent fill segments. FIG. 10D and FIG. 10E illustrate the second ring and the results of filling the second ring respectively. Therein the pixels belonging to the second ring are labeled 2. FIG. 10F and FIG. 10G illustrate the third ring and the results of filling the third ring respectively. FIG. 10H illustrates the fourth ring. FIG. 10I illustrates the final result of filling the exposed area 1010 from the segment 1004. When the result is compared to the actual value of the exposed area as illustrated in FIG. 4B, one can see FIG. 10I. is a much better reconstruction of the exposed area than was FIG. 9I. Thus the method of selecting a set of fill segments as described above produced a superior reconstruction of the exposed area.

Recalculation:

In one embodiment of the present invention the set of fill segments may be recalculated. In certain situations the set of fill segments chosen may not produce optimal results and using a smaller set may better approximate the actual color values of the exposed area. The method involves comparing the predictive filling results with the reference filling results. In this case, a function of the predictive fill values, the reference fill values and the actual values is used as a measure of the closeness of the predictive fill results to the actual values of the exposed area pixels. If this function is above a threshold for the pixels filled by any fill segment or segments, the segment or segments are rejected and the reference fill and predictive fill values are recalculated without the rejected fill segments.

Figure 11:
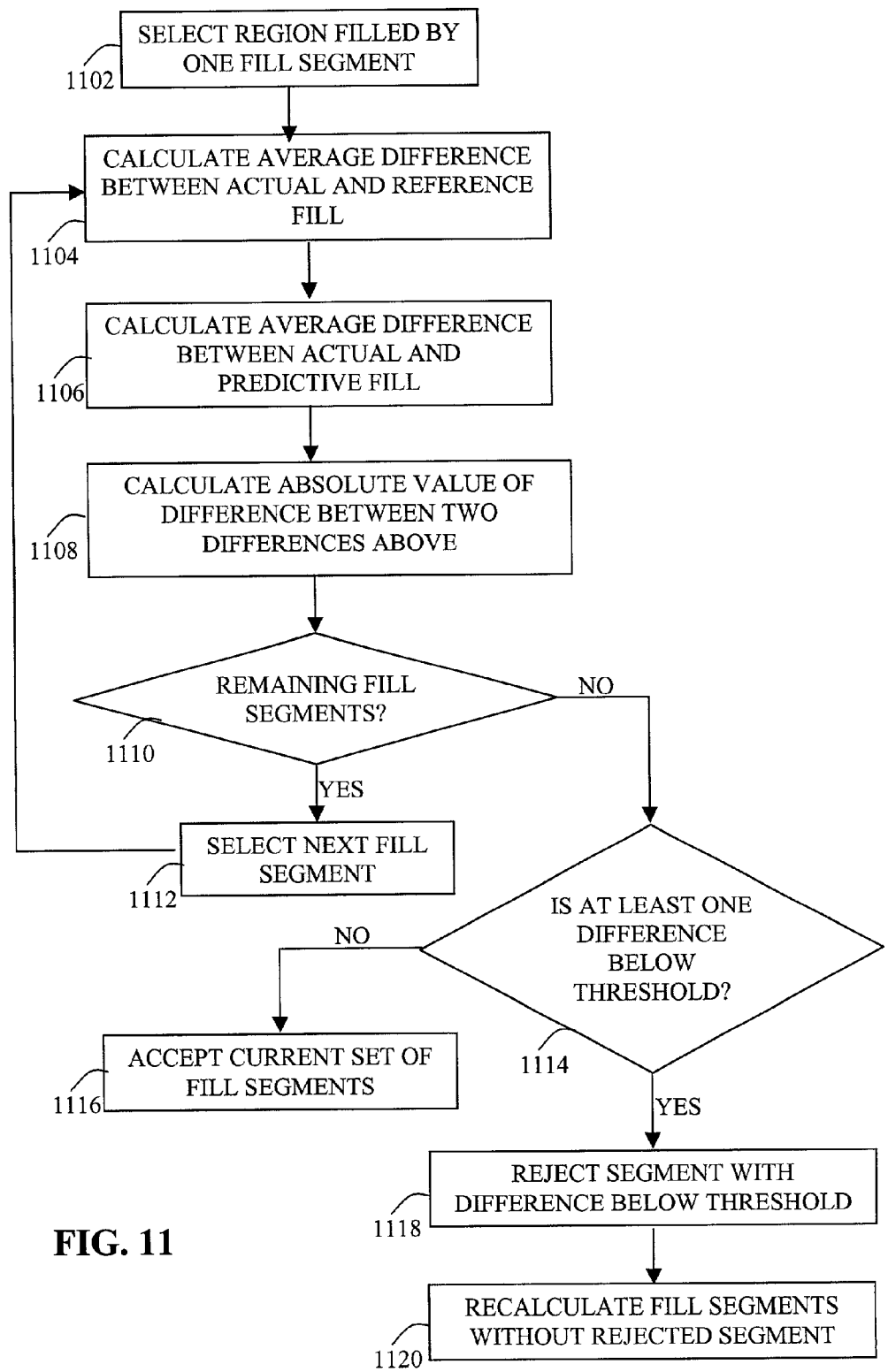
FIG. 11 illustrates the steps of recalculation of fill segments.

FIG. 11 illustrates a method, the routine utilizes in its current embodiment, to determine the quality of the results achieved by predictive filling. Following predictive filling, the routine determines the average of the absolute value of the difference between the actual value and the reference fill value for regions filled by each of the fill segments (1102, 1104). Represented mathematically, if the number of pixels contributed by a fill segment is N, suppose the actual value of any pixel i is denoted by $a_i$, the predictive fill value of the pixel is denoted by $p_i$ and the reference fill value of the pixel is denoted by $r_i$. For each region contributed by a fill segment the value is denoted by, $$\frac{\sum_i^N |a_i - r_i|}{N}$$

The routine also determines, the average of the absolute value of the difference between the actual value and the predictive fill value for regions filled by each of the fill segments (1106). This quantity can be denoted by, $$\frac{\sum_i^N |a_i - p_i|}{N}$$

Then routine the subtracts the average of the absolute value of the difference between the actual values and the reference fill values, from the average of the absolute values of the difference between the actual value s and the predictive fill values (1108). This process is repeated for areas filled by each of the fill segments (1110, 1112). If for any segment, this value is above a threshold, the routine decides to do a recalculation (1114, 1118), otherwise the current set of fill segments are accepted as the final set (1116). Represented mathematically, if for any region contributed by a fill segment the quantity, $$\frac{\sum_i^N |a_i - p_i|}{N} - \frac{\sum_i^N |a_i - r_i|}{N}$$

is greater than a threshold value, then a recalculation is initiated. In other embodiments, any other function of the actual values, reference fill values and the predictive fill values can be used to determine whether a recalculation should be done.

Prior to recalculation of the fill segments, any fill segment or segments that fail to meet the above criteria is excluded from the set of possible boundary segments. Using this reduced set of boundary segments the routine then carries out reference filling, determines a set of fill segments and carries out predictive filling (1120).

In the current embodiment, one recalculation is performed if necessary, however, in other embodiments, multiple recalculations may be done.

Figure 12:
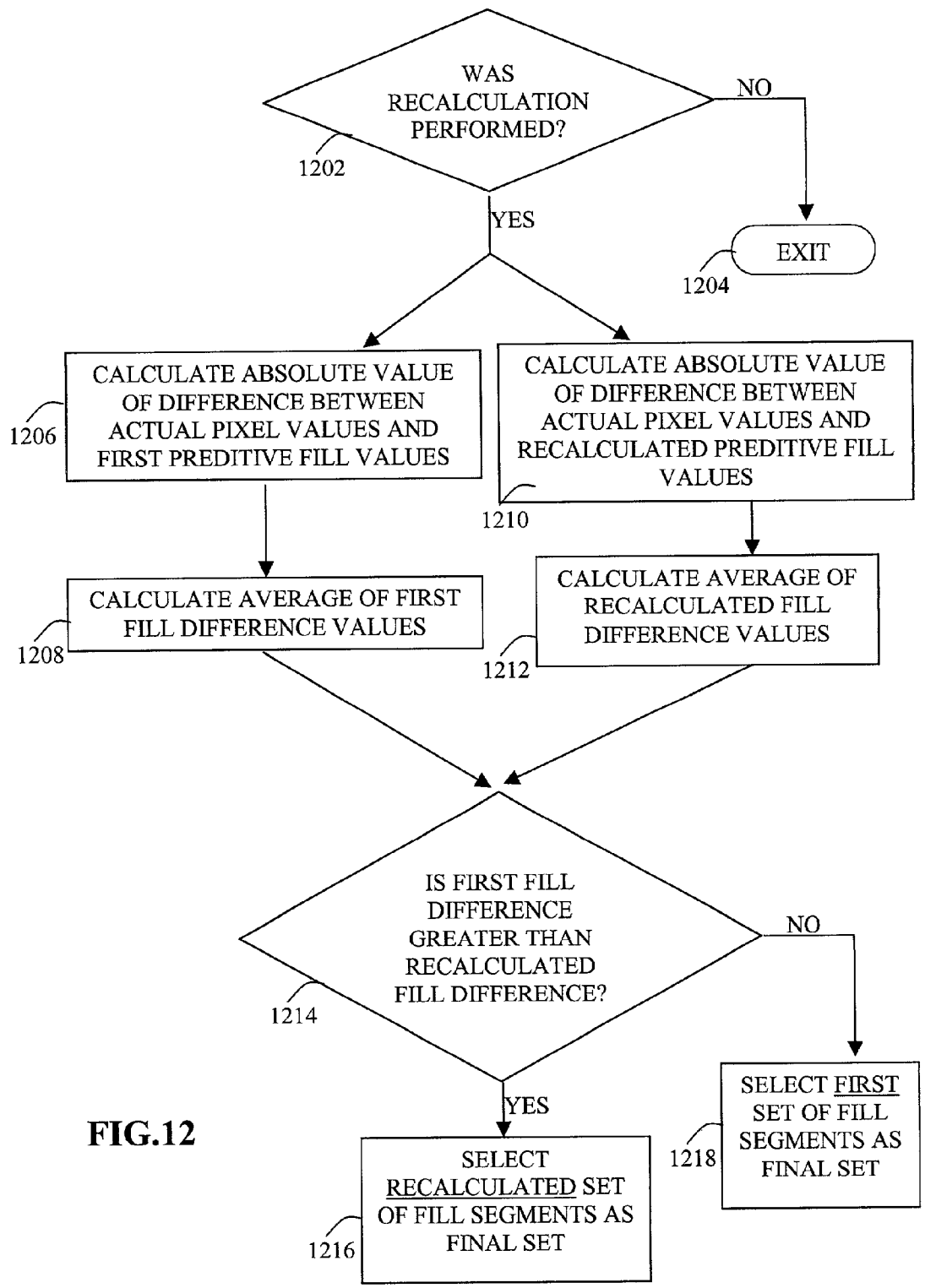
FIG. 12 illustrates the steps of determining the final set of fill segments.

Selection of the Final Fill Segments:

As delineated in FIG. 12, if a recalculation is preformed, the routine then determines whether the set of fill segments determined after the first calculation or the set determined after recalculation is superior (1202, 1204). The routine first calculates the average of the absolute values of the differences between the first predictive fill values and the actual values of all of the pixels in the exposed area (1206, 1208). It is important to note that the above difference is not calculated for the areas contributed by each of the fill segments, rather this is a global difference calculated for all of the pixels within an exposed area. Next the routine calculates the average of the absolute values of the differences between the recalculated predictive fill values and the actual values of all of the pixels in the exposed area (1210, 1212). If the actual fill value of a pixel 'n' is denoted by $a_n$, the first predictive fill value is denoted by $p_{fn}$, and the recalculated predictive fill value is denoted by $p_{rn}$, then represented mathematically, the two above differences will be, $$\frac{\sum_{n}^{M}|a_n - p_{fn}|}{M}$$

and, $$\frac{\sum_{n}^{M}|a_n - p_{rn}|}{M}$$

where the total number of pixels in an exposed area is denoted by M.

If the average of the absolute values of the differences between the first predictive fill values and the actual values is greater than the average of the absolute values of the differences between the recalculated predictive fill values and the actual values, the routine selects the set of fill segments determined during the recalculation as the final fill segments (1214, 1216). Represented mathematically if, $$\frac{\sum_{n}^{M}|a_n - p_{fn}|}{M} > \frac{\sum_{n}^{M}|a_n - p_{rn}|}{M}$$

then the recalculated set fill segments is chosen.

If however, the average of the absolute values of the differences between the first predictive fill values and the actual values is less than the average of the absolute values of the differences between the recalculated predictive fill values and the actual values, the routine selects the set of fill segments determined during the first calculation as the final set of fill segments (1218). Represented mathematically if, $$\frac{\sum_{n}^{M}|a_n - p_{fn}|}{M} < \frac{\sum_{n}^{M}|a_n - p_{rn}|}{M}$$

then the recalculated set fill segments is chosen.

If the average of the absolute values of the differences between the recalculated predictive fill values and the actual values is greater than the average of the absolute values of the differences between the first predictive fill values and the actual values, the routine selects the set of fill segments determined during the first calculation as the final fill segments (1214, 1216). If the average of the absolute values of the differences between the recalculated predictive fill values and the actual values is less than the average of the absolute values of the differences between the first predictive fill values and the actual values, the routine selects the set of fill segments determined during the recalculation as the final set of fill segments (1218).

Figure 13A:
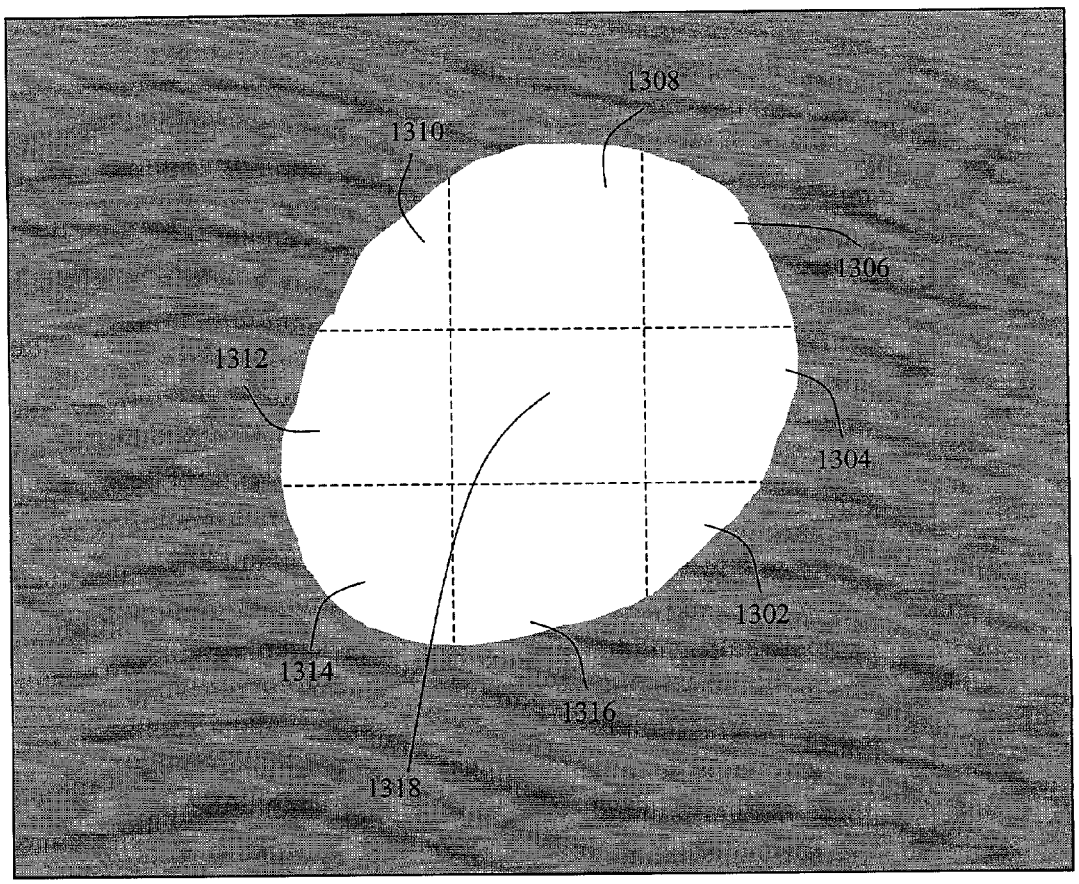
FIG. 13 A–B illustrate exposed areas with multiple sub-regions.
Figure 13B:
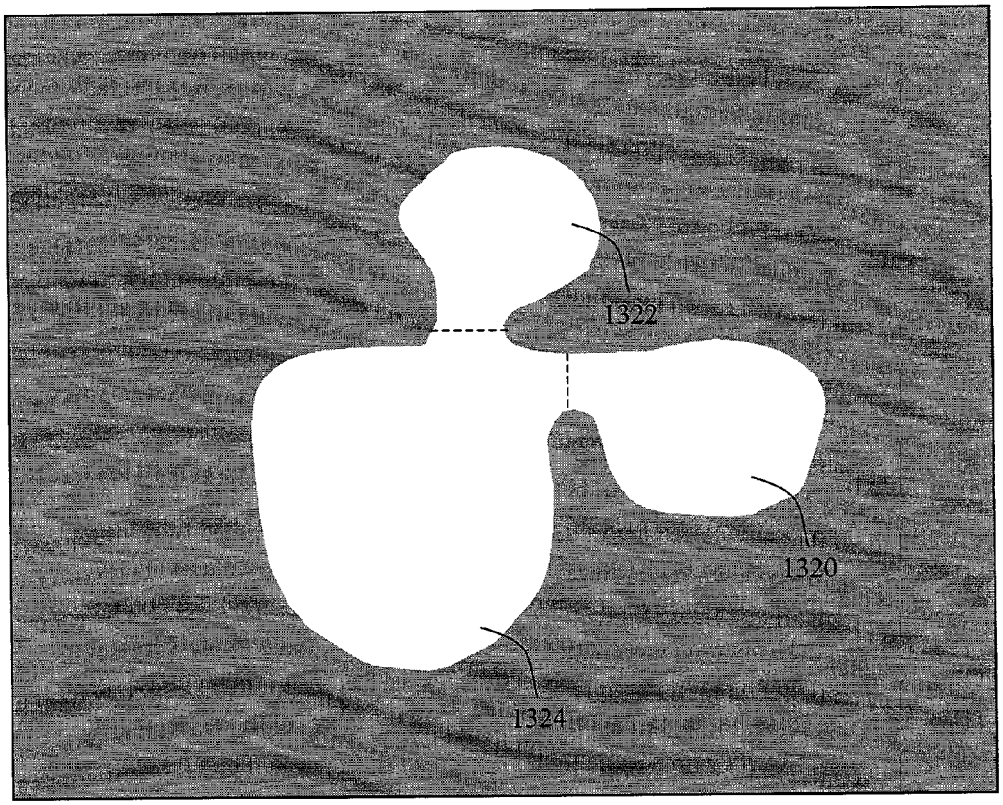

Filling of Exposed Areas Consisting of Multiple Subdivisions:

When the exposed area is very large or has a very complex geometrical shape, it generally becomes more difficult to reconstruct it accurately by predictive fill. In such cases, it may be more beneficial to divide a large exposed area into smaller subregions. This situation is illustrated in FIG. 13A. In another embodiment of the present invention such a method of subdividing is also applied exposed area with relatively complex geometric shapes such as the exposed area illustrated in FIG. 13b. The purpose of this subdivision as in FIG. 13b is to decompose the exposed area into several exposed areas with simpler geometries. For the purpose of this disclosure, it does not matter how to divide the exposed area into subdivisions. What matters is that there may be a situation where filling of exposed areas becomes more accurate if the exposed areas are subdivided.

The above scheme of filling a single exposed area can be easily extended to fill the exposed areas consisting of multiple subdivided regions. In this case, fill begins with the most exterior subdivisions and progresses into the more interior subdivisions. For example, in FIG. 13a, the most exterior subdivisions are 1302, 1304, 1306, 1308, 1310, 1312, 1314, and 1316 (only 1318 is the interior subdivision), and in FIG. 13b, all the subdivisions are already exterior subdivisions. For each subregion that is identified as the exterior subregion, a set of fill segments need to be determined in the same manner as described above. After completing the selection of final fill segments choose fill segments another predictive filling is performed for each of the exterior subregions. Next a global error of predictive fill against the actual image is calculated for all the exterior subdivisions. In one embodiment the error is measured by calculating the average of the absolute value of difference between the predictive fill value and the actual pixel value for each subregion. Similar to the reference fill, only the subdivision(s) for which the error is smaller than the pre-determined threshold are finally allowed to be filled. After the subdivisions for which the error is smaller than the pre-determined threshold are filled, a new set of exterior subdivisions are identified. The exterior subdivisions which were not filled in the previous attempt are once again identified as exterior subdivisions. Then, a set of subdivision(s) among the newly identified exterior subdivisions which are allowed to be filled during the current attempt is then determined in the same manner just described above. Here, the subdivisions which had been already filled during the previous attempts are also allowed to fill the current exterior subdivisions. This process is then repeated until all the subdivisions in the exposed area are filled Transmission:

Once the set of fill segments have been finalized in the manner described above, the information regarding which segments are to be used as fill segments is transmitted to an exemplary decoder for efficient reconstruction of the exposed area. The fill segment information may also be coupled to a residue encoder to improve the local image quality.

For exposed areas where the exposed area was filled after subdividing it into multiple subregions, after all the subdivisions are filled and the set of fill segments as well as the order the filling the subregions have been finalized, the information regarding which subregion is filled in which order and from which fill segments, is sent to the exemplary decoder.

The above description is illustrative and not restrictive. The scope of the invention should, therefore, be determined not with reference to the above description, but instead should be determined with reference to the appended claims along with their full scope of equivalents.

What is claimed is:

1. A method of filling an exposed area of unfilled pixels in an image frame of a video sequence using color information from boundary segments adjacent to the exposed area, the method comprising:
   determining the boundary segments adjacent to the exposed area;
   determining a kernel around each unfilled pixel along a boundary of the exposed area; and
   calculating a statistical distribution of colors for each boundary segment adjacent to the exposed area based on color values of all pixels within the kernel belonging to that boundary segment.

2. The method of claim 1, further comprising calculating a statistical parameter from said statistical distribution of colors for each boundary segment.

3. The method of claim 2, further comprising:
   calculating a difference between actual color values of the unfilled pixel based on a previous image frame of the video sequence and the calculated statistical parameter for each boundary segment; and
   identifying which boundary segment provides a smallest said difference.

4. The method of claim 3, further comprising:
   filling the unfilled pixel with the calculated statistical parameter of the boundary segment with the smallest difference if the smallest difference is less than a threshold value.

5. The method of claim 4, further comprising:
   assigning to the unfilled pixel, a segment identifier of the boundary segment with the smallest difference if the smallest difference is less than a threshold value.

6. The method of claim 5, further comprising:
   leaving the unfilled pixel as unassigned to a boundary segment if the smallest difference is greater than the threshold value.

7. The method of claim 6, further comprising:
   increasing the threshold value if a certain percentage or less of the unfilled pixels are assigned to a boundary segment using a current threshold value.

8. The method of claim 7 where the percentage is zero.

9. The method of claim 5, further comprising:
   repeating the steps in claims 1 through 5 for each unfilled pixel along the boundary of the exposed area until an entirety of the exposed area is filled.

10. The method of claim 2, wherein statistical distributions of three color components Y, U, V are used in calculating the statistical parameter.

11. The method of claim 2, where statistical distributions of each component of a multi-spectral image are used in calculating the statistical parameter.

12. The method of claim 2, wherein the statistical parameter is a median color value.

13. The method of claim 2, wherein the statistical parameter is a statistical moment of a distribution of color values.

14. A method of determining image segments to be used for filling an exposed area of unfilled pixels in an image frame of a video sequence, the method comprising:
   filling the exposed area using color information from boundary segments adjacent to the exposed area;
   calculating a percentage of pixels within the exposed area that is filled by each of the boundary segments; and
   calculating a geometric parameter that represents a geometric shape of a portion filled by each of the boundary segments.

15. The method of claim 14, wherein the geometric parameter representing the geometric shape is a function of a perimeter length of the filled portion, or a function of an area of the filled portion.

16. The method of claim 14, wherein the geometric parameter representing the geometric shape is a function of both a perimeter length and an area of the filled portion.

17. The method of claim 14, further comprising:
   selecting a segment as a tentative fill segment, if an area of the portion filled by the segment is greater than an average area of the portions filled by all of the boundary segments;
   selecting the segment as the tentative fill segment, if the area of the portion filled by the segment is less than said average area but greater than a certain threshold value, and the geometric parameter of the portion filled by the segment is within a threshold range; and
   otherwise rejecting the segment as the tentative fill segment.

18. The method of claim 17, wherein a set of tentative fill segments are selected, and further comprising:
   calculating a function of a perimeter length that each of the tentative fill segments contribute to a perimeter of the exposed area.

19. The method of claim 18 where the function of the perimeter length is a normalized ratio of squares of perimeter lengths.

20. The method of claim 19, further comprising:
   calculating a function of an area contributed by each of the tentative fill segments.

21. The method of claim 20 where the function of the area is a normalized ratio of areas.

22. The method of claim 21, further comprising:
   calculating a function of a difference between said normalized ratio of squares and said normalized ratio of areas.

23. The method of claim 22 where the function of the difference between the ratios is a sum of absolute values of the difference between the ratios.

24. The method of claim 23, further comprising:
   excluding a segment corresponding to a greatest value obtained by subtracting the normalized area from the normalized length squared; and
   recalculating the sum of the absolute values of the difference between the ratios.

25. The method of claim 24, further comprising repeating said excluding and recalculating until the sum of the absolute values of the difference is greater than that calculated during a previous recalculation.

26. The method of claim 25, further comprising selecting the set of segments used to calculate a lowest sum of the absolute values of the differences as the image segments to be used for filling the exposed area.

27. An apparatus for filling an exposed area of unfilled pixels in an image frame of a video sequence using color information from boundary segments adjacent to the exposed area, the apparatus comprising:
   means for determining the boundary segments adjacent to the exposed area;
   means for determining a kernel around each unfilled pixel along a boundary of the exposed area; and
   means for calculating a statistical distribution of colors for each boundary segment adjacent to the exposed area based on color values of all pixels within the kernel belonging to that boundary segment.

28. An apparatus for determining image segments to be used for filling an exposed area of unfilled pixels in an image frame of a video sequence, the apparatus comprising:

means for filling the exposed area using color information from boundary segments adjacent to the exposed area;

means for calculating a percentage of pixels within the exposed area that is filled by each of the boundary segments; and means for calculating a geometric parameter that represents a geometric shape of a portion filled by each of the boundary segments.

* * * * *